INVENTOR
CECIL S. WISE
BY Cushman, Darby & Cushman
ATTORNEYS

June 20, 1972   C. S. WISE   3,671,078

MATERIAL DISTRIBUTING SYSTEM

Filed July 9, 1969   8 Sheets-Sheet 2

INVENTOR

CECIL S. WISE

BY Cushman, Darby & Cushman
ATTORNEYS

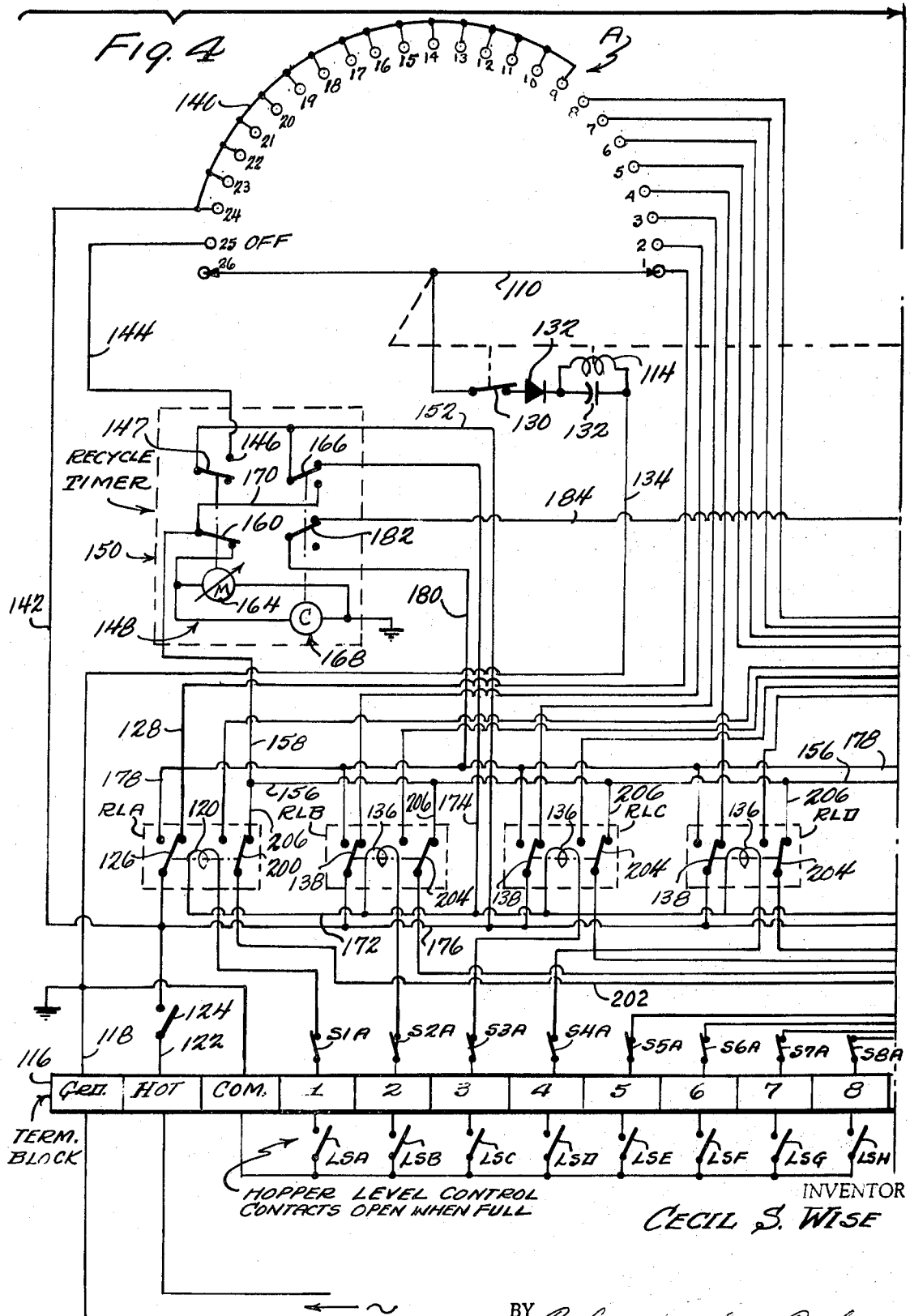

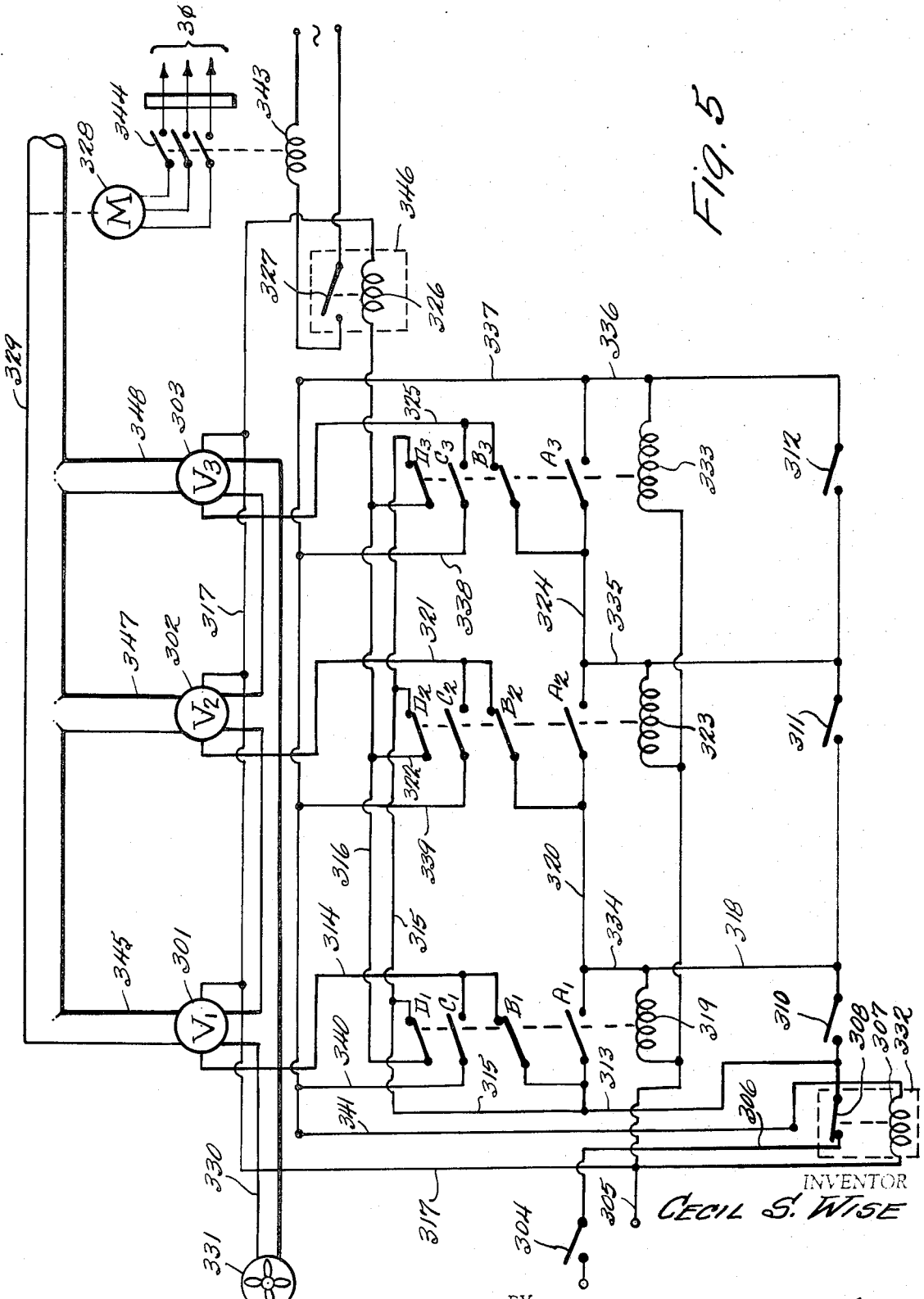

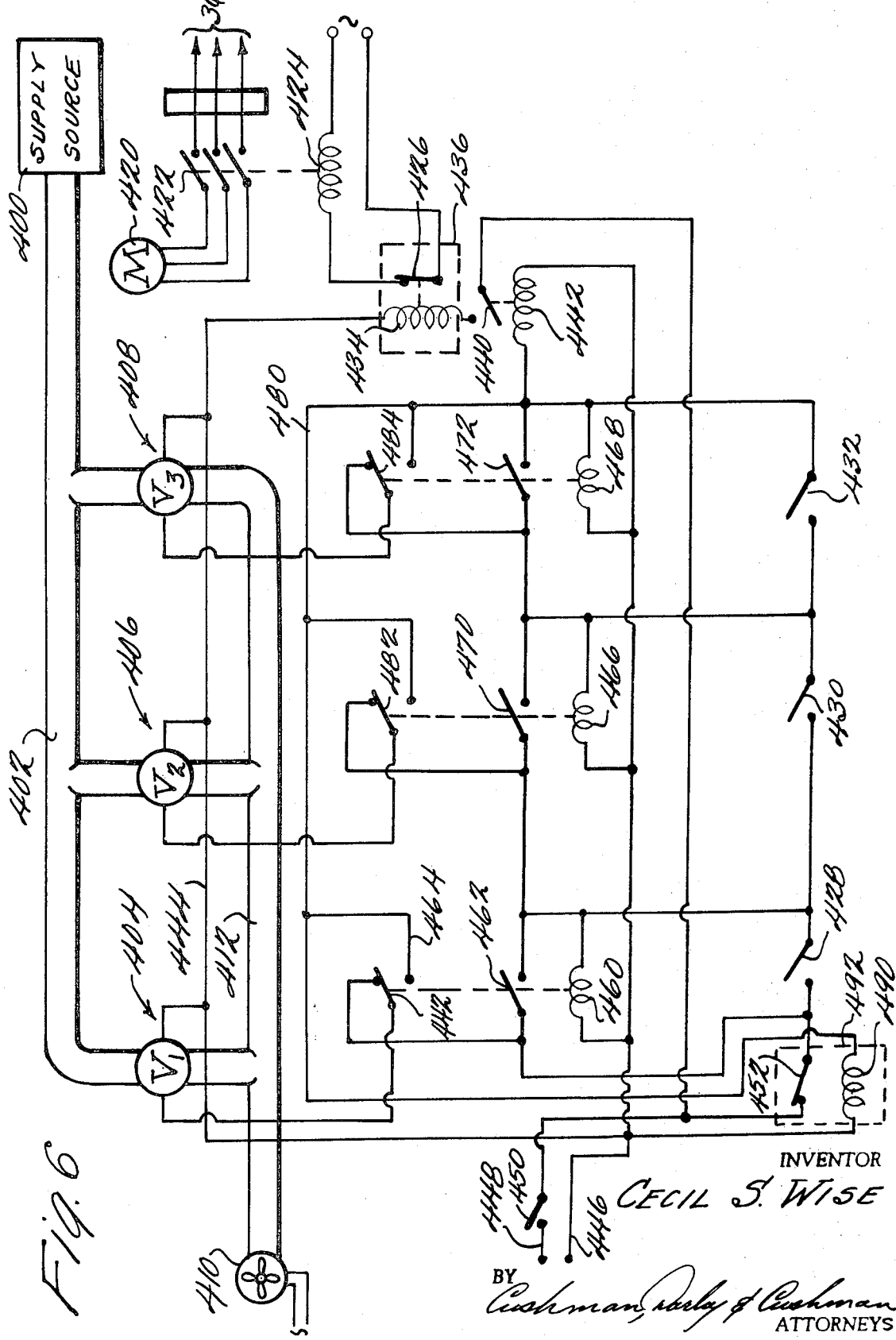

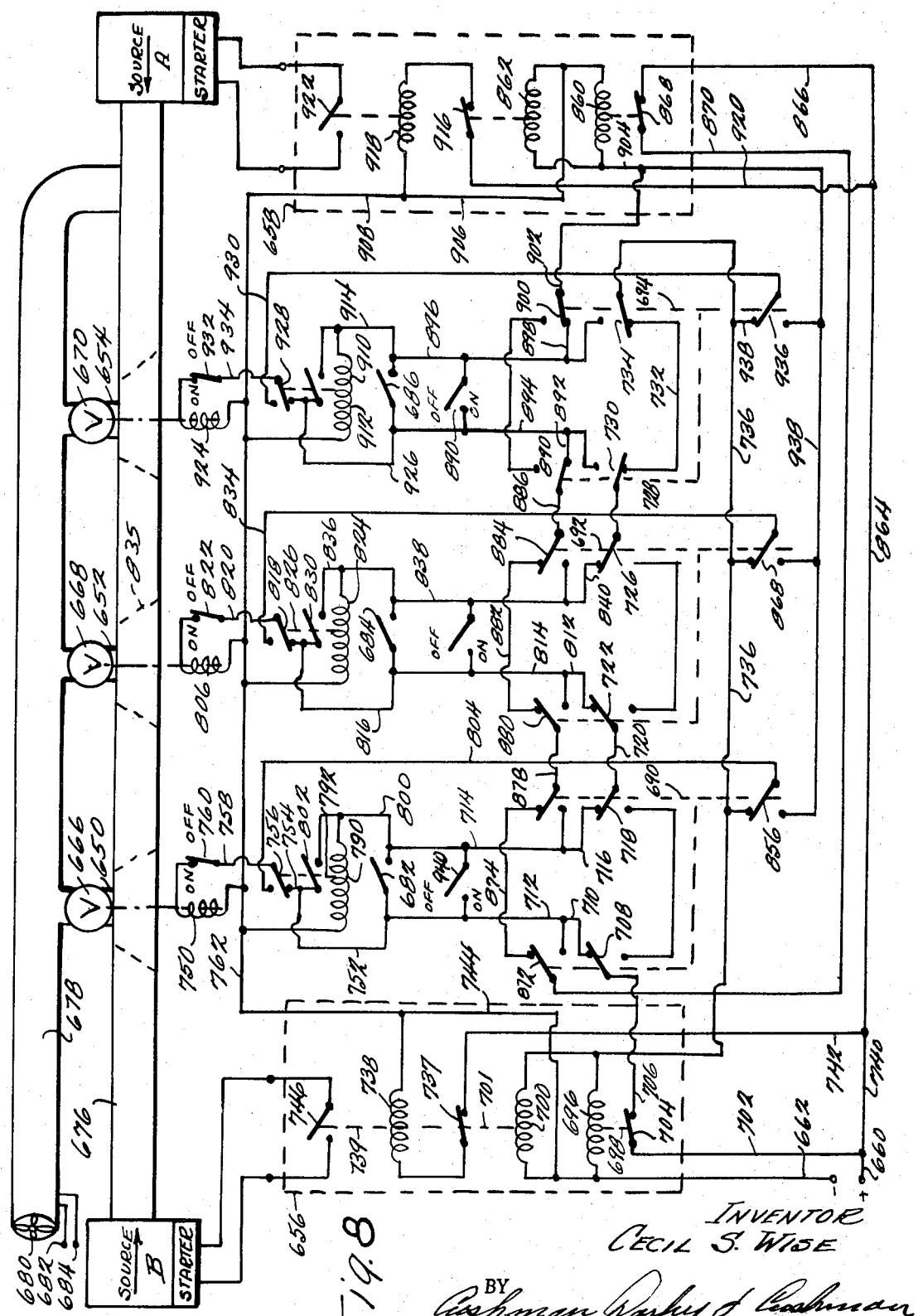

United States Patent Office 3,671,078
Patented June 20, 1972

3,671,078
MATERIAL DISTRIBUTING SYSTEM
Cecil S. Wise, Dallas, N.C., assignor to Fiber
Controls Corporation, Gastonia, N.C.
Continuation-in-part of applications Ser. No. 217,154,
Aug. 15, 1962, Ser. No. 444,885, Mar. 2, 1965, Ser.
No. 538,437, Mar. 3, 1966, Ser. No. 561,579, June 29,
1966, and Ser. No. 694,268, Dec. 28, 1967. This application July 9, 1969, Ser. No. 848,133
Int. Cl. B65g 53/04
U.S. Cl. 302—28
45 Claims

ABSTRACT OF THE DISCLOSURE

A system for distributing fibers pneumatically from a source to any of a plurality of distributors and electrical control circuitry for determining which distributors receive fibers in which order. Several electrical control circuits for sequentially checking each of the distributors in a system to determine which of them is demanding fibers and to sequentially satisfy the demands for fibers by opening valves associated with the distributors so that the air stream containing the fibers is drawn into a distributor, wherein the air stream and the fibers are separated, are disclosed. Also disclosed are a number of different distributors suitable for removing fibers from air streams.

This application is a continuation-in-part of application Ser. No. 217,154, filed on Aug. 15, 1962, now forfeited; application Ser. No. 444,885, filed on Mar. 2, 1965, now forfeited, application Ser. No. 538,437, filed on Mar. 3, 1966, now abandoned; application Ser. No. 561,579, filed June 29, 1966, now abandoned; and application Ser. No. 694,268, filed on Dec. 28, 1967, now abandoned.

This invention relates to a distributor system, and, more particularly, to the electrical control system in a system for distributing material, for example, of the type that may be conveyed by a stream of fluid, such as air, to any one of a plurality of stations that demand the material.

The type of material with which this invention may conveniently be employed is such as may be found in textile mills, for example, any type of fiber or fibrous material, but no limitation to such material is necessarily intended. In textile mills, for example, there are many instances in which it is necessary to convey fibers from one processing system to another, and this is generally done by entraining the fibers in an air stream. In order to separate the fibers from the air stream at the point of delivery, an apparatus, conventionally termed a "fiber condenser" is employed. A condenser of this general type is described and claimed in the Lytton et al. Pat. 3,039,149 and the disclosure of this patent is explicitly incorporated herein by reference. A plurality of such condensers, or of other types of material separators as in the Lytton et al. Pat. 3,039,151, the disclosure of which is also explicitly incorporated herein by reference, may be disposed at respective receiving points or stations where it is desired to distribute the fibers in accordance with the needs of a particular station. In such a condenser or distributor, there is an air intake channel and a discharge channel, along with a fiber outlet to a hopper or the like at the respective receiving station, and a controllable doffer or valve for extracting the air and material from the intake channel and separating them to the air discharge channel and fiber outlet respectively when the particular station requires more material. The inlet and discharge channels of each of the distributors are connected in an air circulating system, and the arrangement is such that if the doffer or valve is not actuated the material in the stream of air as it arrives at unactuated station passes that station and proceeds to next. Each station includes a means for sensing the material requirements of that station, and stations are sequentially coupled to an electrical system which actuates the doffer or valve of the respective station or not in accordance with the instant determination of the sensing means thereat.

It is accordingly a primary object of this invention to convey material, for example in a fluid channel, from at least one source to any one of a plurality of different stations and distribute the material to the stations automatically in accordance with their respective requirements.

In order to effect this object, an electrical control system is employed to effect a sensing of the condition of the material sensing means at each station and actuate the distributor or not to cause the material to be deposited or to by-pass that station, and this electrical system, in one specific embodiment, includes stepping switches which operate automatically to deposit material at each station requiring same and to step to the next station to determine its requirements.

It is therefore another object of this invention, in conjunction with the preceding object, to provide an electrical control system of the nature just indicated.

These and other objects of the present invention will become more apparent during the course of the following detailed description and appended claims.

The invention may best be understood with reference to the accompanying drawings, in which.

Figure 4B:
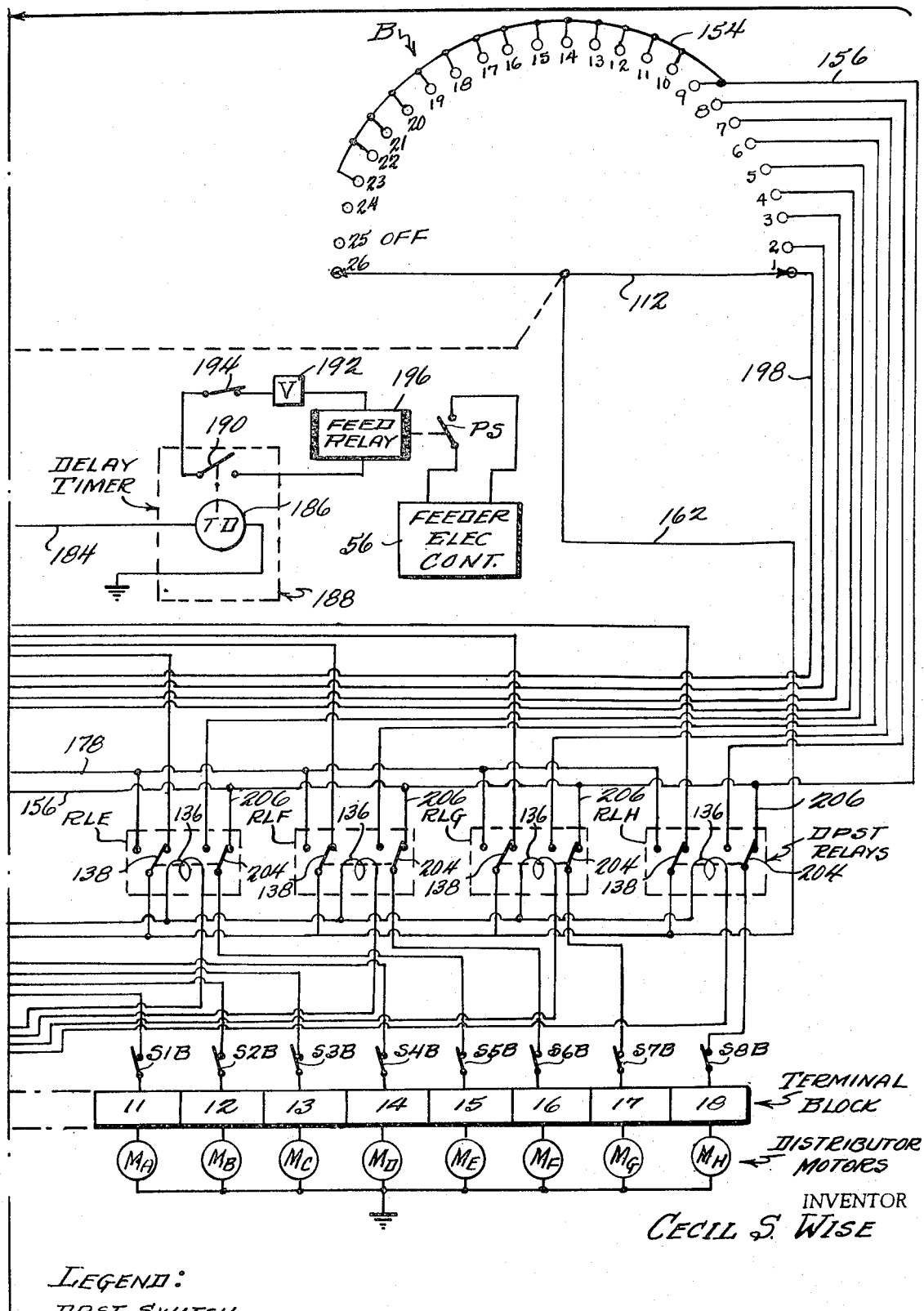
Figure 7:
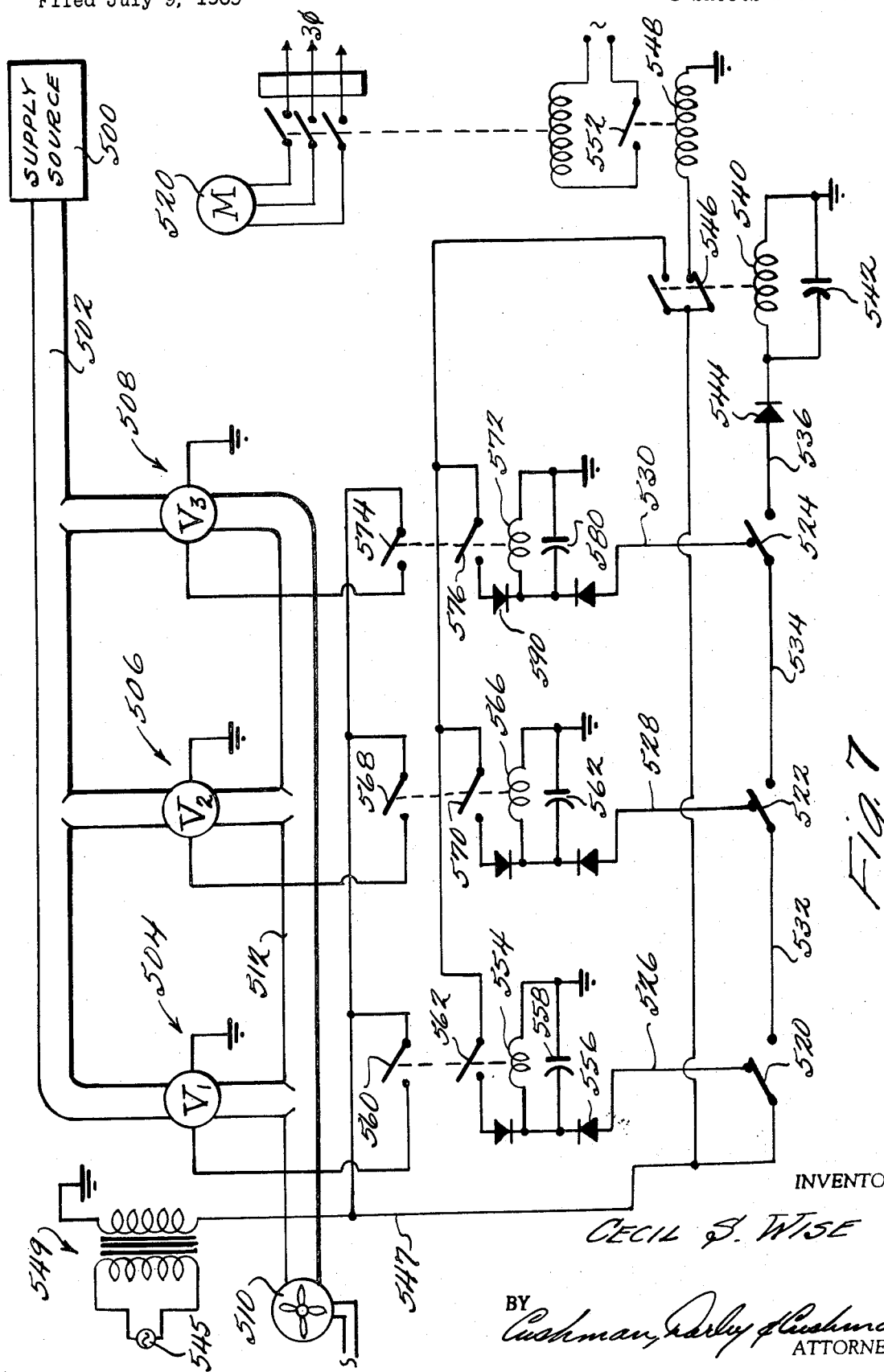

FIG. 4, which consists of FIGS. 4A and 4B joined, is a schematic illustration of another embodiment of the electrical control system of this invention;

FIG. 5 is a schematic illustration of still another embodiment of the electrical control system of this invention;

FIG. 6 is yet another embodiment of the electrical control system of this invention; and FIG. 7 is another embodiment of the electrical control system of this invention.

FIG. 8 is a schematic illustration of another embodiment of the electrical control system of this invention whereby material is distributed from two sources to a number of stations.

Figure 1:
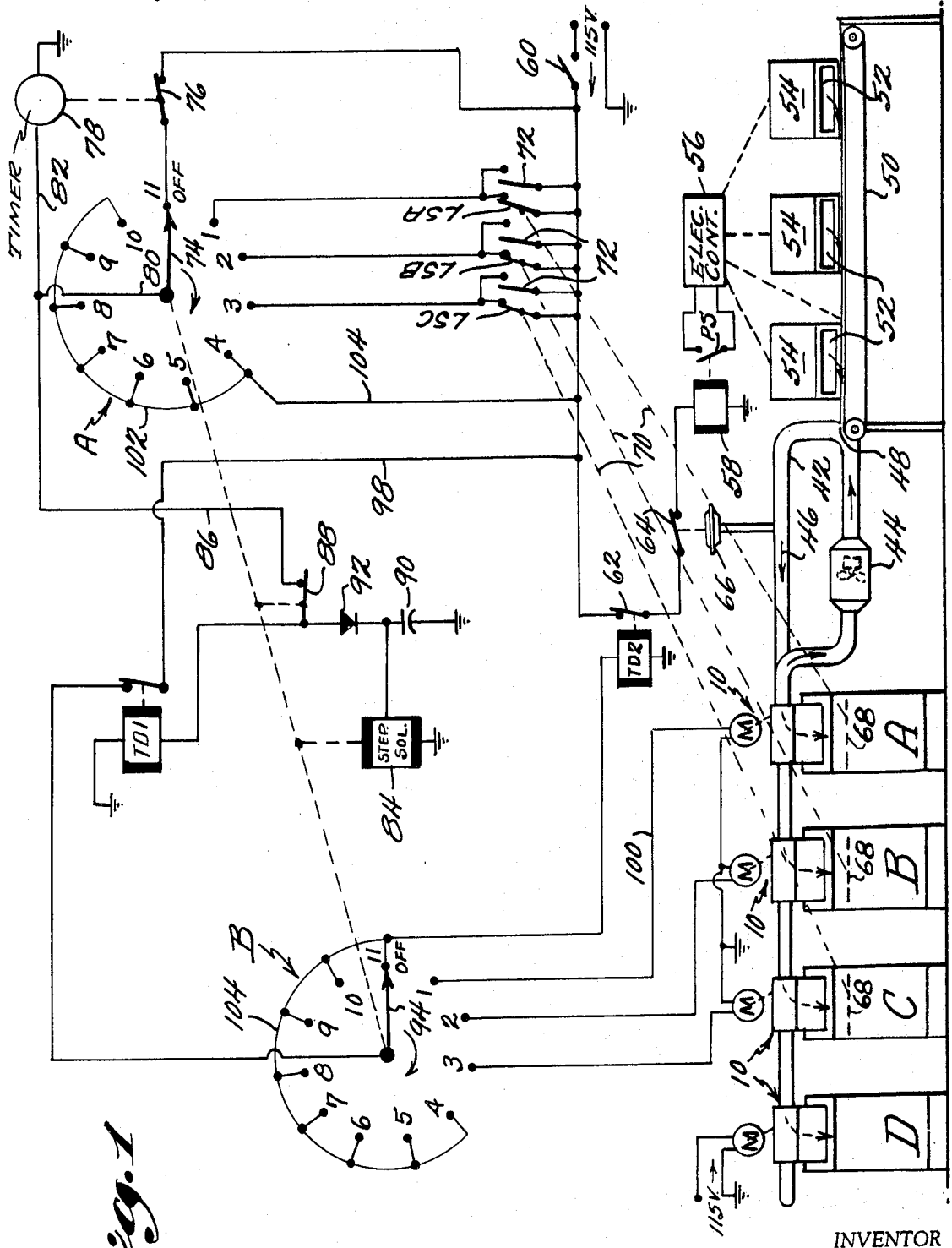
FIG. 1 is a schematic and diagrammatic illustration of the system.

Before proceeding with a description of the electrical control system and overall pneumatic circulating system and supply therefor as shown in FIG. 1, reference is first made to some of the details of the receiving stations A, B, C and D, particularly to the "condenser" or distributor thereof.

There is no limitation as to what each of the stations A, B, C and D may be, but generally each will include some sort of hopper or the like into which the material in question may be deposited, temporarily or for storage purposes. In other words, each of the A, B, C and D stations may be respective storage bin, or a feeder which feeds a carding machine, or delivers fibers to an adjacent storage bin, or each may be picked, or a combination of any or all such units.

Figure 2:
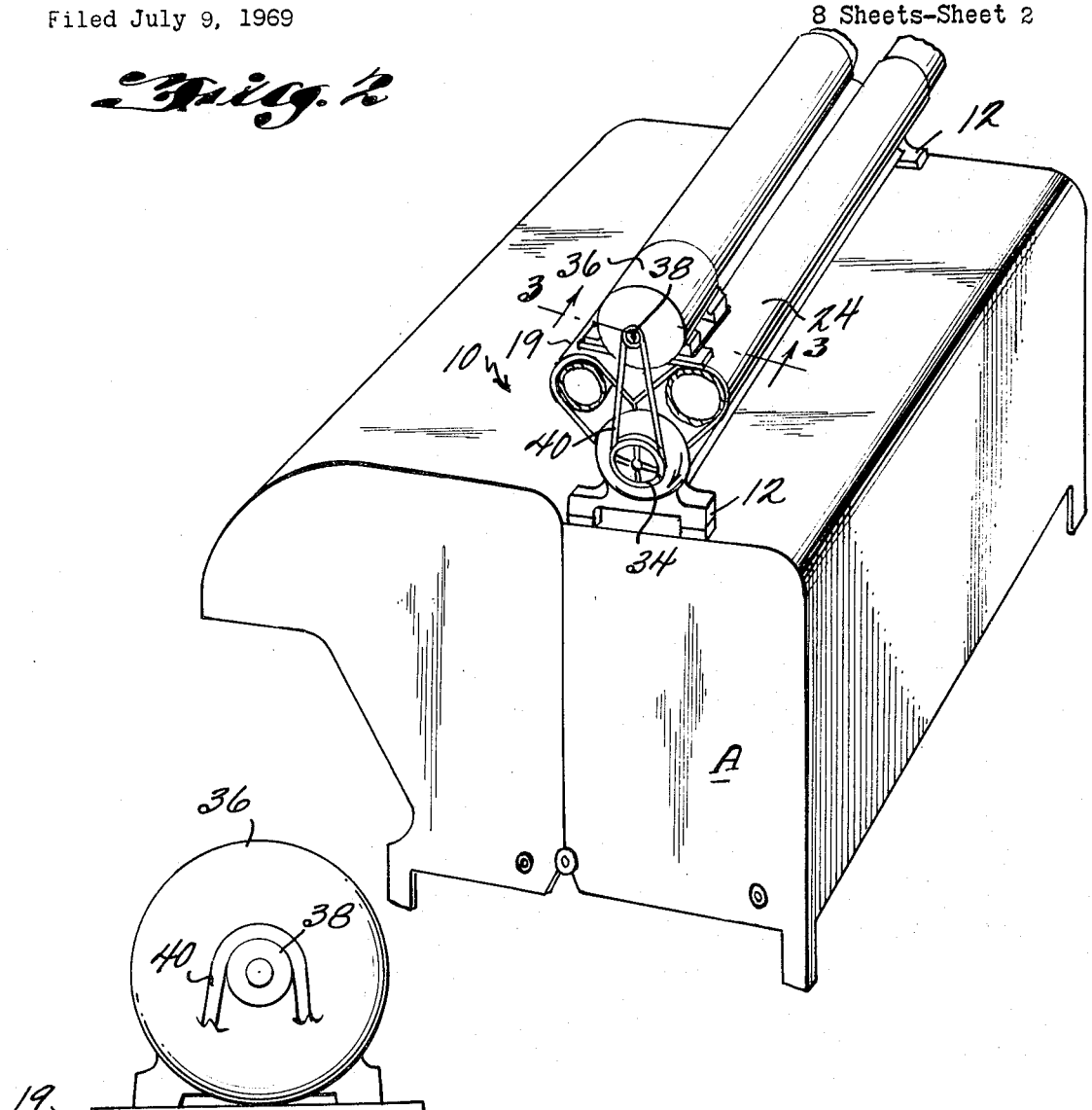
FIG. 2 is a perspective view of one of the stations to which material may be distributed.
Figure 3:
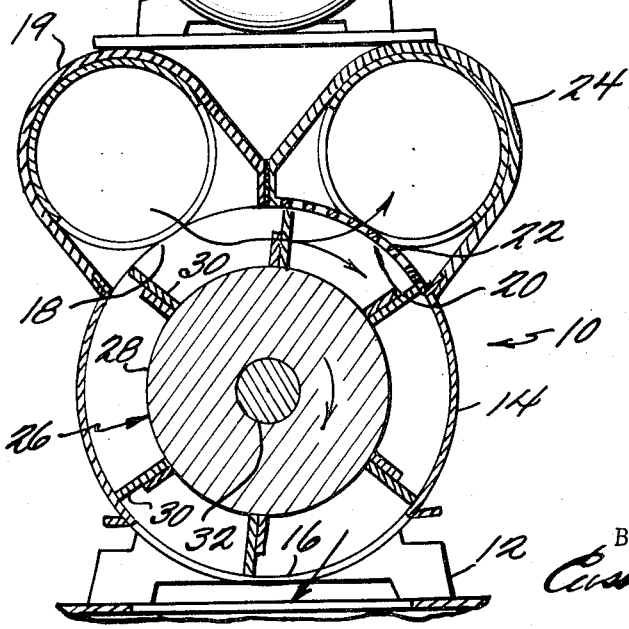
FIG. 3 is a cross-sectional view of one of the distributors.

As above indicated, there is disposed at each of such stations A, B, C and D, means for removing the fibers from the air stream. One such removing means as shown in detail in FIG. 2 for station A, is a distributor 10, a traverse cross-sectional view of which is shown in FIG. 3. Situated on end frame member or legs 12 is a doffer casing 14 which has a fiber discharge opening 16 around its bottom portion for a predetermined length between the legs 12. This length is generally a considerable portion of the distance between the legs. At its upper right arcuate portion, the doffer casing has other arcuate openings extending substantially the same length as fiber discharge opening 16. The upper left opening 18 is longitudinally encompassed by an inverted U-shaped member 19 forming with casing 14 an air and material intake channel. The right hand opening 20 in casing 14 is covered with a screen 22 and an upstanding inverted U-shaped air discharge channel member 24. Within casing 14 is a rotary member or doffer 26 which includes a rotatable cylinder 28 that carries a plurality of doffer blades 30. These blades extend the full length of the intake channel opening 18 and discharge channel opening 20, as well as the fiber outlet 16. Cylinder 28 is disposed on shaft 32 to which is secured a pulley 34. This pulley, and consequently doffer 26, are driven clockwise as shown in FIGS. 2 and 3, by a motor 36 to the shaft of which is connected a pulley 38 that is further coupled to pulley 34 by belt 40.

In operation, any fibrous material or the like that is traveling with the air stream lengthwise in the intake channel defined by U-shaped member 19, is diverted through the doffer casing opening 18 only if the doffer or member 26 is then rotating. In such a case, the air and material are both pulled into the doffer casing in a clockwise direction with the air being further pulled through screen 22 and out through the discharge channel defined by U-shaped member 24. The material, however, cannot pass through screen 22, but is conveyed by vanes or blades 30 into outlet 16. If doffer 26 is not rotating, then any material and air present in the intake channel proceed straight through that channel without being diverted by the distributor into the doffer casing and separated.

When the doffer is not rotating, some of the material proceeding through the intake channel may drop by gravity into the distributor and be drawn against and clog the screen 22. If this clogging causes difficulties, the two channels can simply be shifted about 45° counterclockwise from their illustrated positions so that the outlet channel is directly atop the distributor and the inlet channel along the side of the distributor, half way between the top and bottom.

As will be appreciated by reference to FIG. 1, the intake channels of each distributor 10 are sequentially coupled, and in like manner the air discharge channels are sequentially coupled. For example, the outlet end of the intake channel of the distributor for station A is connected to the inlet end of the intake channel of the distributor for station B, the outlet of that intake channel is connected to the inlet of the intake channel of station D, the oulet of its intake channel is returned to the inlet of its air discharge channel, and at the opposite end of the pneumatic system, the inlet of the intake channel and outlet of the discharge channel of station A are interconnected by tubing 42 in which is disposed an air forcing system. Air is consequently continually circulated in pipe 42 in the direction of arrow 46 through each of the intake and discharge channels of each of the distributors.

Material to be distributed to stations A, B, C and D in FIG. 1 is supplied to the air circulating system at point 48, for example, in any convenient manner and from any desired source of supply. The type of supply diagrammatically illustrated includes a conveyor 50 onto which is deposited proportioned layers of different fibers from respective weight pans 52 which are in turn supplied by feeders 54. Such a system and its electrical controls 56 for automatically placing predetermined amounts of different fibers in continuous or interrupted stacks is fully disclosed and claimed in the co-pending application of Lytton et al. Ser. No. 348,406, filed Apr. 13, 1953, now Pat. No. 3,071,202, and the disclosure of that patent is explicitly incorporated herein by reference.

In that patent, there is disclosed, in the upper left corner of FIG. 12 for example, a switch denoted PS, reference thereby being made to a "picker switch," which is closed when fibrous material should be supplied by the conveyor 50, and opened when it should not be. In other words, switch PS operates the electrical controls of the apparatus to cause it to start and stop as required by other equipment. For purposes of the present disclosure, this switch is made a part of relay switch 52, which when energized closes switch PS. Therefore, whenever start switch 60 is closed conveyor 50 will supply fibrous material as long as normally closed relay switch 62 and the normally closed pressure switch 64 are closed so as to energize relay 58 and close switch PS.

With the closing of start switch 60, pressure switch 64 will be closed as long as fan 44 is operating and forcing air through the pneumatic circulating system sufficiently to cause the pressure differential element 66 to pull in switch 64. Under such circumstances, fibrous material will be conveyed and drawn into the air circulating system and conveyed therethrough for distribution at stations A, B and C according to the demand of such stations, any residual or excess of fibrous material being automatically emptied into station D due to its motor being run constantly, so that no fiber will ever come to rest in the circulating system itself and tend to choke air circulation.

As has been previously indicated, each of the stations has a demand sensing means, and this may take any desired form, for example, a rake or other type level control 68 the height of which varies with the amount of material present at the station. When the station in question has a sufficient amount of material, then a limit switch is held closed by the level control 68. On the other hand, when the station requires material, level control 68 holds the limit switch open until the demand is fulfilled, at which time the limit switch recloses. The respective limit switches are designated LSA, LSB, and LSC, with operation thereby in accordance with the respective level controls 68 being indicated by dash lines 70. Each of the limit switches may be phralleled by a respective hand switch 72 for the purpose of by-passing any or all of the stations A, B and C when not needed, but for purposes of considering the operation of the remaining electrical system, it will be assumed that all switches 72 are open as illustrated.

Depression of start switch 60 applies current to the movable arm or wiper 74 of bank A of self-stepping rotary switch system having two banks A and B, via the normally closed contact 76 of times 78 and the off or number 11 position of bank A. This supplies current on line 80 to timer 78 via line 82, thereby energizing the timer and causing its contact 76 to open until a predetermined time after wiper 74 returns to position number 11 following its full stepping cycle around the switch bank. The stepping cycle is caused by supplying current from line 80 also to time delay relay TD1 and stepper relay 84 via line 86 and self-stepping contact 88. Current proceeding from line 86 through contact 88 divides to energize relay TD1 and cause its normally closed contacts to open immediately, and to charge condenser 90 sufficiently through rectifier 92 to operate stepper relay 84 and cause stepping contact 88 to open and wiper arm 74 of bank A and wiper arm 94 of bank B to rotate clockwise one step to position number 1. The breaking of contact 88 de-energizes the coil of relay TD1 and allows its switch contact to close after a delay of one or two seconds, as desired.

The purpose of delaying the closing of relay TD1 contacts at this particular time is to prevent energization of wiper arm 94 on bank B with current from line 98, and thereby present energization of the motor of distributor 10 at station A via line 100, until it is determined by wiper 74 whether that station is calling for material to be separated from the air stream and deposited thereat. In other words, if limit switch LSA is closed so as to provide current to wiper arm 74 and thereby effect another and immediate stepping by the stepping relay 84, the distributor motor at station A will not even be momentarily energized; nor will the motor at station B be immediately energized then (regardless of the position of limit switch LSB) since relay TD1 was reset to its full delay time by current from the closed LSA switch. On the other hand, if the level control 68 at station A causes limit switch LSA to be open, wiper arm 74 is not then energized and stepper relay 84 will not cause movement of the wiperarm to their next position. Instead, after a short delay, the contact of relay TD1 closes and supplies current to the distributor motor of station A via wiper arm 94 and line 100. This motor continues to run and fill the station with material extracted by the distributor from the air stream, until level control 68 closes limit switch LSA and effects a stepping of wiper arms 74 and 94 to their respective number 2 positions.

At this second station, the level control will be causing the limit switch LSB to be open or closed in accordance with the sensed requirements at station B, and accordingly the distributor motor at that station will operate or not to fulfill the requirements indicated. If there is no need for fibers at station B, the fibrous material in the air stream will continue in the pneumatic circulation system without any of the fibers being diverted into station B, and the stepping relay 84, will automatically move wiper arms 74 and 94 to their respective number 3 positions, in the same manner above indicated.

This same procedure automatically occure for station C, but when wiper arms 74 and 94 are moved to their respective number 4 positions, there is no sensing of demand at station D as long as the electrical system is connected as illustrated in FIG. 1. As previously indicated, station D has its distributor motor connected continuously to a source of supply so as to operate continuously and extract from the circulating air any leftover fibrous material, to keep same from choking or tending to choke the pneumatic circulation system.

It will be noted that in the bank A stepping switch, positions 4–10 are interconnected by line 102, which in turn is connected to the source of energy via line 104. Accordingly, wiper arm 74 is continuously energized from position numbers 4–10, and consequently current results on lines 80, 86, and self-stepping contact 88 to stepper relay 84, causing wiper arm 74 to move step-by-step from position number 4 to position number 11 automatically without delay. Of course, wiper arm 94 of bank B does likewise since it is also mechanically connected to relay stepper 84. The interconnection of bank B positions or terminals number 4–11 by line 104 has nothing to do with effecting the stepping itself, but causes relay TD2 to be immediately energized by current from line 98 through the TD1 contact and wiper arm 94, while that wiper arm is at each of positions number 4–11, inclusive. Relay TD2 delays closing its contact after de-energization for a time comparable to the TD1 delay time, and renews its full delay time each time it is re-energized. This means the contact of relay TD2 opens beginning with position number 4 and stays open until wiper arm 94 advances from position number 11 to position number 1 at the beginning of the next cycle, nothwithstanding momenting cutoffs of current to the coil of relay TD2 by self-stepping contact 88 and the contact of relay TD1. Accordingly, while the stepping switches are at or between positions numbers 4–11, the electrical controls 56 are turned off by the resultant de-energization of relay 58 and opening of its switch PS.

Each step of wiper arm 74 on bank A, except the off or number 11 position, eventually, if not immediately, supplies current to timer 78. This timer, therefore, gets continually charged, and is not allowed to run out and close its contact 76 until wiper arm 74 returns to the off or number 11 position, after which time the timer contacts close within a predetermined time, say 8 to 10 minutes. This delay in closing time contact 76 allows sufficient time for any one of the stations A to C to have any maximum requirement fulfilled by fiber in the circulating air stream, and also allows time for the different stations A, B and C to utilize the material extracted from the air stream in accordance with the type of equipment thereat.

No limitation is intended by the number of receiving stations or number of rotary stepping switch positions utilized in the example discussed above, since with an eleven position switch any number of stations up through ten may be selectively coupled thereto and, of course, the number of switch positions may be increased to one hundred or more to accommodate whatever number of receiving stations that need to be involved in any given situation. The same is true for the embodiment of FIG. 4 which is now described as operating with eight stations A . . . H (not shown).

Like the embodiment in FIG. 1, the embodiment of FIG. 4 also employs two switch banks A and B, which have respective wiper arms 110 and 112 stepped in unison by the stepping solenoid 114 from each of 25 different positions, represented by switch contacts numbered through 25, to the next.

The active contacts of switch banks A and B, i.e., contacts number 1–8, are connected between eight demand indicating or limit switches LSA . . . LSH and eight distributor actuators such as motors $M_A$ . . . $M_H$. The limit switches LSA, etc. are any type of desired hopper level control contacts, for example, similar to those in FIG. 1 which are connected to the level indicating element in the hopper at each of the stations. Actuators $M_A$ etc. may be condenser motors as in FIG. 1, or they may be transition valves or the like by which material being conveyed by the conveyor means is directed, or not, into the hopper at the station where the actuator is located, according to whether the corresponding level indicating or limit switch is in a closed condition indicating the hopper demands material, or in an open position indicating the hopper is full. In FIG. 4, the level switch LSA is associated with the same station as distributor actuator $M_A$, level switch LSB is associated with the same station as distributor actuator $M_B$, etc.

In a manner explained in more detail below, the eight level control switches LSA . . . LSH are connected through terminal block 116 and respectively by eight relays RLA . . . RLH to contacts number 1–8 of switch bank A. In particular, level control switch LSA is connected at one side to the common ground line 118 and at its other side through one pole S1A of a double pole single throw switch which has its other pole, designated S1B, serially connected with motor $M_A$. Switch S1A, which is closed whenever station A is to benefit from the control system, is connected to the coil 120 of relay RLA. As long as level switch LSA is open, current from the "hot" line 122 passes through a system master switch 124 to relay contact 126 which in its deactuated (illustrated) position connects to line 128. In turn, line 128 is connected to contact number 1 of switch bank A. Consequently, when wiper arm 110 is on that contact, current passes through the wiper arm and the normally closed self-stepping solenoid contact 130, diode 132, and the solenoid coil 114, with a slight delay in operation of the stepping solenoid being effected by a condenser 132. Current returns to ground via line 134. Solenoid 114 not only steps wiper arm 110 and 112 to a second position so as to be on contact number 2, but also opens the self-stepping contact 130, thereby initially breaking the circuit and de-energizing coil 114.

It is apparent from the foregoing description that as long as the other level control switches LSB . . . LSH are all open, the respective coil 136 of relays RLB . . . RLH will remain de-energized, and their left contacts will therefore remain in their rightward position so as to apply solenoid stepping current to the respective contacts number 2–8 of switch bank A. Consequently, wiper arm 10 will, under the condition of all level switches LSA . . . LSH being open, automatically step from contact number 1 to contact number 2, etc., until it arrives on contact number 9 of switch bank A.

While it is not necessary for this invention to have a group of switch bank contacts unused, FIG. 4 illustrates how a switch bank with an excessive number of contacts, may still be employed neverthless. Unused contacts number 9–24 are connected together by conductor 140, which in turn is connected to line 142 and thereby back to the current source on line 122. Consequently, wiper arm 110 is continually energized from terminals number 9–24 and stepper solenoid 114 steps the wiper arm from one to the next of these terminals automatically. At terminal 24, it steps wiper arm to the "off" terminal number 25. This last terminal is similar to switch bank terminal 11 in FIG. 1, in that the equipment is held in an off condition for a predetermined length of time before it is automatically recycled.

As may be noted in FIG. 4, contact number 25 of switch bank A is connected by line 144 to terminal 146 of a motorized delay relay 148 in a recycle timer 150. Since terminal 146 is not initially connected to relay contact 147 and therefore cannot receive current from line 152, it is apparent that the stepping solenoid 114 is not immediately energized via wiper arm 110 when it is on contact number 25.

To show how it is finally energized, reference is made to switch bank B, where it will be noted at contacts number 9–23 are connected together by line 154, which in turn connects to line 156. At the far left end of line 156 in FIG. 4A, line 158 connects line 156 to relay contact 160. Wiper arm 112 of switch bank B is continuously energized by virtue of its connection via line 162 to the "hot" line 122. Therefore, it is apparent that as soon as the wiper arm 112 makes contact with terminal number 9 of switch bank B, current is conveyed thereby to line 156, and further over line 158 to relay contact 160 of the delay motor 164. This motorized delay relay 148 is of the variable delay type and does not actuate its contacts until the delay time manually set into the motor runs out. At the end of that time, which may be up to 12 seconds or so, relay contacts 147 and 160 shift over to their unillustrated positions, breaking the circuit to motor 164 and connecting wiper arm 110 at contact number 25 to current on line 152 so as to cause stepper solenoid 144 to step wiper arm from contact number 25 to contact number 1. This is done in one step since the opposite half of wiper arm 110 comes onto contact number 1 immediately as the other half thereof moves off contact number 25.

Since contact number 24 of switch bank B is not connected to the common line 154, current over lines 156 and 158 ceases when wiper arm 112 steps onto contact number 24. This would de-energize motor 164, if it were not for the fact that the clutch relay contact 166 was actuated when wiper arm 112 previously moved onto contact number 9, since then the current overlines 156 and 158 also energized the coil of clutch relay 168. The relay immediately operates its contacts upon being energized or de-energized. When relay contact 166 was thereby pulled downwardly, the current on line 152 was transferred to line 170 so as to keep current continuously applied via relay contact 162, the delay motor 164 and clutch relay 168, thereby obviating any problem that might otherwise occur when wiper arm 112 steps onto a contact which is not connected to line 154.

When the motorized delay relay 148 times out so as to move its contacts 147 and 160 upward, the circuit to the delay motor 164 and clutch coil 168 is broken, and the relay contacts of each immediately return to their illustrated positions and the delay motor is automatically reset. As previously indicated, wiper arms 110 and 112 then step from their respective contacts number 25 to number 1, and the cycle begins all over again.

The foregoing describes a complete cycle of events when none of the level control switches LSA . . . LSH is closed. However, the cycle is interrupted whenever it is sensed, in the sequence of sensing the condition of these switches that one of them is closed. If the first station served by the system is demanding more material be distributed into its hopper, then the level control switch LSA is closed. This completes a circuit from ground through relay coil 120, lines 172 and 174, relay contact 166 and lines 152, 176 and 122. Accordingly, contact 126 of relay RLA is operated to its leftward position so as to apply current to lines 178 and 180, relay contact 182 and line 184 to the coil 186 of a delay timer 188. This timer waits for about the time to complete one cycle, for example about 10 seconds, until it closes its contact 190. This completes a circuit from a voltage source 192 through a manual feed switch 194 to a feed relay 196. This relay has as its contact the picker switch PS of the FIG. 1 apparatus which feeds material to the conveying and distributing system through the feeder electrical control 56, also shown in FIG. 1.

At the same time, wiper arm 112 of switch bank B, while it is on contact number 1, feeds current from line 162 to line 198 back to relay RLA and therethrough via contact 200 which is not in its leftward position because of the energization of relay coil 120. From relay contact 200, current is conveyed by line 202 through the closed switch S1B and terminal 10 of block 116, to distributor motor $M_A$. This motor, therefore, is actuated and causes the material that is being fed due to the closure of the feed relay contact PS, into the hopper at the first station A. The delay by timer 188 allows motor $M_A$ to come up to full speed before the material is fed toward it for distribution in the hopper of station A.

As soon as the hopper of station A becomes full, its limit switch LSA opens, thereby de-energizing relay RLA. This turns off motor $M_A$ since relay contact 200 moves to the right. The rightward movement of the other relay contact 126 causes current to be applied over line 128 to contact number 1 of switch bank A. As before described, this causes the wiper arms to step to contact number 2.

From the above description, it is apparent that if any of the level control switches LSB . . . LSH is closed, the coil 136 of the respective relay RLB . . . RLH is energized to move its contacts 138 and 204 leftwardly so as to energize the respective motor $M_B$ . . . $M_H$ and cause a feed of material by the closure of the picker switch PS.

After the condition of the last level switch LSH is sensed and material fed and distributed by motor $M_H$ to station H, if required, wiper arms 110 and 112 move onto contacts number 9. As previously indicated, this energizes the delay relay 148 and clutch relay 168 to start the recycle delay time that is set into the delay motor 164. During this time, the clutch relay contact 182 opens so as to prevent energization of the feed relay 196 until after the wiper arms return to their respective number 1 contacts. Since line 156 from bank B is carrying current while wiper arm 112 is on contacts numbers 9–23, and since that line is connected by respective lines 206 into each of the relays RLA . . . RLH so as to deliver current through the right hand relay contact 200 in relay RLA and 204 in the others, all eight of the distributors $M_A$ . . . $M_H$ are thereby actuated during that time. This clears the material conveying line by adding any remaining material into the adjacent machine hoppers, readying the whole distributing system for another cycle.

FIG. 5 of the drawings discloses a further embodiment of the invention. Valves or "fiber condensers" indicated by numerals 301, 302 and 303 are transition valves which are normally closed but are opened when a demand is indicated by the station at which they are located. These valves or "fiber condensers" are used to separate the fibers of the material from the conveying air stream at the point of delivery. Apparatus of this general type is described and claimed in the Lytton et al. Pat. No. 3,039,-

149. A plurality of such transition valves or condensers, or other types of material separators as in the Lytton et al. Pat. No. 3,039,151 are disposed at respective receiving points or stations where the fibers are to be distributed in accordance with the demand of a particular station. The circuit diagram controlling these valves will now be explained.

With the system initially at rest, master control switch 304 will be closed and it will energize power line 306. The pneumatic timer 307, including switch 308, which is normally closed, and coil 309, will not effect the operation until the recycling sequence of the system is to become effective. This part of the operation will be discussed infra.

The level control switches 310, 311 and 312 are located within the respective receiving stations of the system. They are normally open and are closed only when the level of the material indicates the particular station is filled and no longer needs any material. Assuming for the moment that all the level control switches 310 through 312 are open, indicating a demand at all the stations, line 306 will be energized when switch 304 is closed. The open condition of level control switch 310, as previously assumed, shows that the first station in line is demanding material. With the energization of line 306 and switch 310 being open, line 313 will be energized since switch 318 is normally closed. The power will be transmitted to transition valve 301 through lines 313 and 314 since relay contact $B_1$ is normally closed. The circuit is completed through return line 317. Line 313 will concurrently also energize lines 315 and 316 through normally closed relay contact $D_1$. With the energization of line 316, coil 326 of feed timer 346 will be energized. This circuit is also completed by return line 317. The delay timer will close switch 327 after a definite elapse of time, usually in the range of 5 seconds. When switch 327 closes, coil 343 is energized, which in turn will close three phase switch 344, thereby powering motor 328 which will begin the flow of material to conduits 329 and 345. Transition valve 301 being open, is now capable of transmitting the received supply of material to its respective station.

When this first station is filled, level control switch 310 will close, energizing thereby relay coil 319 through line 318. With the energization of coil 319, relay contacts $B_1$ and $D_1$, which normally were closed, are now open, and relay contacts $A_1$ adn $C_1$, which were normally open, will now be closed. Coil 326 of course is not de-energized to stop feed motor 328 until all of the switches $D_1$, $D_2$ and $D_3$ have been opened. With the closing of relay contact $A_1$, power from line 313 will be transmitted to line 320 and through relay contact $B_2$, which is normally closed, to line 321, thereby opening transition valve 302. Concurrently, power from line 313 will flow through line 315, through normally closed relay contact $D_2$ to lines 332 and 316. The supply of material is thus continuously fed to conduits 329 and 347, now being thereby deposited through transition valve 302 into its respective station.

When the level control switch 311 indicates that the station no longer needs any material, it will close, thereby completing a circuit through lines 306 and 335, energizing relay coil 323, whereupon relay contacts $D_2$ and $B_2$, which were normally closed, are open, thereby closing transition valve 302. Relay contacts $A_2$ and $C_2$, which were normally open are now closed. As we had previously assumed, level control switch 312 was open and remains open indicating a demand in its respective station. This demand will now be fulfilled since the closing of relay contact $A_2$ will transmit power to line 324, through normally closed relay contact $B_3$ and line 325 to thereby open transition valve 303. Power will now still be transmitted to the feed supply circuit through lines 313, 315, normally closed relay contact $D_3$ to line 316. This keeps energized the coil 326, which in turn keeps closed coil 343 energized, three phase switch 344 closed and feed motor 328, which will feed the material through conduits 329 and 348 into the respective station which is fed by transition valve 303, operating.

It will be noted from this specification that the control valves 301, 302 and 303 are operably actuated when the level control switches 310, 311 and 312 are respectively open, indicating demand at each respective station. The station demand requirement was fulfilled in the system shown in FIG. 5, by first filling the station furthest away from the supply line, then sequentially filling the remaining stations, from the furthest in the line to the nearest in the line relative to the supply source. This sequence is established so that the conduits 345, 347, 348 and 329 will be kept substantially clear of residue material during the operable distributing time of the system. Through the use of this sequence any material residue which may remain in conduit 329 during the filling of the first station will be used to fulfill the demand of the second station thereby limiting the amount of residue material remaining in the conduits which will be purged therefrom during the purging operation described infra.

Upon the completion of the filling operation, level control switch 312 will close thereby energizing relay coil 333. The relay contacts $B_3$ and $D_3$, which normally are closed, are now open and relay contacts $A_3$ and $C_3$ which normally are open are now closed. With the closing of relay contact $A_3$, power will be transmitted to all the relays through lines 313, 320, and 324 thereby assuring that relay windings will remain energized even though a level control switch may now be opened.

Concurrently with the closing of relay contact $A_3$ power will flow through line 337 which will transmit power to lines 338, 339 and 340 which because relay contacts $C_1$ and $C_2$ and $C_3$ are closed, will open all the transition valves connected thereto, shown as 301, 302, and 303.

In this operation all the transition valves are open. However, no supply is being fed into the conduits, therefore, the opening of all the transition valves at the present time will insure that any residue material which has remained in the conduits during the distribution operation will be cleared therefrom and drawn into the respective stations. The duration of this purging operation is controlled by the pneumatic timer 307 since with the energization of line 337, line 341 will transmit power to coil 309 of the pneumatic timer. This will open switch 308, which is normally closed after a predetermined time interval, thereby cutting off all power to the system.

The opening of the transition valves 301, 302, and 303 during the purging operation which allows the residue material to be transmitted into the respective station is also a safety feature since the fan 331 is continuously drawing out, and if allowed to do so for an extended period of time it will eventually collapse the conduits. The feed motor 328 is stopped after completion of the feeding operation and it does not commence the feeding until the complete operation is recycled after the conduits are purged. It is during this interim that the conduits may collapse, however, the invention eliminates this detriment by opening the transition valves, thereby purging the conduits and preventing collapse. The fan 331 could be electrically connected to the primary circuit, so that when switch 308 opens, thereby closing the system, it could concurrently also stop the fan. In the embodiment shown in FIG. 5, the fan 331 is shown to be independent of the main circuit, for purposes of clarity and is not considered a limiting feature.

Pneumatic timer 307 can be set to any specified length of time. This time is dependent upon the required distribution of the operation, since with the energization of coil 309, switch 308 will once again assume its closed position thereby beginning the distribution cycle all over again.

This embodiment, of course, is not limited as shown to three stations, since stations can be added to either side of the line without departing from the scope of the invention.

The number of stations can be changed, either increased or decreased, by any desired number at either end of the system. That is, stations can be added at the right end of FIG. 5 by merely removing line 337 and inserting the desired number of valve-relay combinations in parallel with those already existing. Line 337 would then be placed across the corresponding terminals of the last station. Other stations could be added at the left end of FIG. 5 by removing line 341 and inserting in parallel with the existing stations a desired number of additional stations with line 341 being replaced across the corresponding terminals of the leftmost near station. Reference is now made to FIG. 6 which shows another electrical control system similar to the circuitry illustrated in FIG. 5. In the embodiment of FIG. 6, as in the embodiment of FIG. 5, fiber is supplied from a suitable source 400 to a pneumatic line 402 which carries the entrained fibers to each of the stations in the system and these stations, in the embodiment of FIG. 6 are stations 404, 406 and 408. A fan 410 is connected to the pneumatic output line 412 to draw the entrained fibers through the line 402 and to a station to be supplied so that the entrained fibers are diverted through a station when valves $V_1$, $V_2$ or $V_3$ associated with a station are opened in the manner described above. As in the embodiment of FIG. 5, an electrical motor 420 causes the supply source 400 to supply fibers to the line 402 and the energy to operate this motor 420 is supplied from a conventional three-phase source via ganged switches 422. These normally open ganged switches 422 are closed together when current flows through a conventional relay coil 424 which is connected to a suitable alternating current source via a normally closed switch 426, which is in turn controlled by relay coil 434 of relay 436. Relay coil 434 is connected to an energy source via normally closed switch 440, which is in turn controlled by relay coil 442. Should any of the rake or demand switches 428, 430 or 432 associated with stations 404, 406, and 408 respectively be open, indicating a demand for fibers at that station in the same manner as discussed above, then the relay coil 442 will be deactivated thereby allowing the normally closed switch 440 to return to its normally closed position permitting current to flow through coil 434, closing switch 426 which in turn completes a current path through relay 424, closing switches 422 and supplying the energy to the motor 420 which then supplies fibers to line 402 as described above.

If, for example, all of the rake switches 428, 430 and 432 are open, indicating a demand for fibers at each of these stations 404, 406 and 408, then the circuitry will operate substantially in the manner described above causing each of the stations to be served in turn. The stations are served in order starting with the one furthest from the source 400 and proceeding toward source 400. Any stations not exhibiting demand are skipped and after being skipped if a station demands fiber it is not served until the cycle has been completed and line 402 purged.

Thus, if the switch 428 is open then current first flows from line 448 through closed on-off switch 450 and normally closed switch 452 through the switch 442, which is a single pole, double throw switch replacing the switches B and C in the embodiment of FIG. 5, through the valve $V_1$ to the line 444 and from line 444 back to the other side of the energy supply connected to line 446. When the rake switch 428 subsequently closes indicating the demand has been temporarily satiated, a current path is completed through the coil 460 which responds by closing switch 462 and shifting the switch 442 into connection with line 464 in preparation for the purge. Similarly, if the stations 406 and 408 are demanding fibers, they are supplied in turn and the relays 466 and 468 are successively activated to shift the positions of the switches controlled thereby if no demand is indicated or after the demand has been satiated in the same manner as described above with regard to FIG. 5.

After demand at all stations has been completely fulfilled, a current path is completed through the relay 442 via switches 462, 470 and 472. The passage of current through coil 442 opens normally closed switch 440, causing coil 434 to be deactivated thus opening switch 426. The opening of switch 426 deactivates relay 424 which in turn opens switches 422 so that no more fibers are supplied to the line 402.

In the same manner as with FIG. 5, all of the valves $V_1$, $V_2$ and $V_3$ are now opened to purge the line 402 of fibers which have been dropped within the line 402 and which will eventually clog it if not periodically removed. The closing of all of the switches, 462, 470 and 472 completes a current path from line 448 to line 480 which is in turn connected to the line 444 through each of the switches 442, 482, and 484, which are shifted from their illustrated position, and valves $V_1$, $V_2$ and $V_3$ so that current passes through the valves $V_1$, $V_2$ and $V_3$ to cause them to open. Air then passes through each of these valves and to the fan 410 and the system is purged of fibers remaining in line 402.

Current also passes from the line 444 through the coil 490 of the relay 492. In the same manner as in FIG. 5, coil 490 is of the time delay type which pauses briefly in opening its normally closed switch 452. After a short time, the switch 452 is opened to interrupt the purging path through the valves $V_1$, $V_2$ and $V_3$ and to deactivate the coils 460, 466 and 468. The system then returns to its initial state and again responds to demands at any of the stations 404, 406 or 408 as described above.

FIG. 7 illustrates another control system for controlling the supplying of fibers to a plurality of fiber stations connected to a supply source by a pneumatic tube. As in the embodiment of FIGS. 5 and 6, the source 500 supplies entrained fibers to a line 502 to which are connected stations 504, 506 and 508, having valves $V_1$, $V_2$ and $V_3$ respectively associated therewith for the removal of fibers in the same way as described above. Also, as in the embodiment of FIGS. 5 and 6, a fan 510 or like device is attached to the return line 512 and the entrained fibers are drawn through the tube 502 toward the fan 510 and through the valves $V_1$, $V_2$ and $V_3$ which are successively opened to withdraw the fibers as described above.

In contrast to the other embodiments described above, the arrangement shown in FIG. 7 has a built-in priority. By this it is meant that the circuitry is designed to serve stations associated with a given pneumatic line set order and to interrupt the feeding of an unsatisfied station at any time in favor of another station having a higher priority that is demanding fibers. Further, the arrangement shown in FIG. 7 is designed to deal, at least partially, with the problem of overfeed which can result with the arrangement shown in FIGS. 5 and 6 if any of the stations attached to the line 502 is not removing the fibers which are deposited therein during each purge. Since the station closest to the fan 510 normally receives the bulk of the fibers which are purged at the end of each cycle, this station in particular is susceptible to being overloaded. The circuitry shown in FIG. 7 solves this problem by only opening the valve of the last station actually served during a cycle for purging the line 502. Thus if a station does not receive fibers during a cycle, it cannot receive fibers during purging.

Like the embodiments of FIGS. 5 and 6, the arrangement in FIG. 7 employs level control or rake switches 520, 522 and 524 which operate in the same manner as described above, connecting to the lines 526, 528 and 530, respectively, when in a demand condition and connecting to the lines 523, 534 and 536 when the station associated therewith does not want fibers. Thus, if any of the switches 520, 522 and 524 are in the illustrated demand positions, the feed relay 540 which has a capacitor 542 connected in parallel with it and a diode 544 connected in series with it to rectify the current from the alternating current source 545 which is coupled to line 547 by conventional transfer 549 is deactivated, permitting switch 546 which it controls to resume its normally closed and switch 580 its normally open position. The closing of switch 546 in turn activates relay 548 which in turn closes normally open switch 550 activating a feed motor 552 in the same manner as described in connection with FIGS. 5 and 6 to feed fibers to line 502 from source 500.

In the arrangement of FIG. 7, the priority of stations receiving fibers is from left to right with the station 504 having the highest priority, the station 506 having the second highest priority, and the station 508 having the lowest priority. It should be apparent that priority can be assigned any stations any way desired although stations are normally served beginning with those furthest from the source. Thus in this embodiment, assuming the station 504 is demanding fibers, it is served first as follows. The relay 554 is activated by the current flowing through the switch 520 and line 526 and rectified by the diode 556. A capacitor 558 is connected in parallel with the relay 556 and is quickly charged to provide a D.C. voltage across relay 554 to close switches 560 and 562. The closing of switch 560 completes a current path through the valve $V_1$ which then opens and diverts the entrained fibers in the line 502 through station 504 in the same manner described above. The closing of switch 562 is in preparation for the purge of the system as described below. When the demand of station 504 has been satiated, and assuming station 506 is demanding fibers, the rake or level control switch 520 shifts into connection with the line 532 and a current path is thus completed via switch 522 through the relay coil of the next station to receive fibers, namely station 508. Relay 566 then closes switches 568 and 570 in the same manner as relay coil 554, completing a path through the valve $V_2$ and also preparing for the purge. When the station 506 has been satisfied, switch 522 shifts into connection with line 534 and the relay 572 of the station 508 is activated to close switches 574 and 576 and complete a current path through valve $V_3$ and prepare for a purge.

The system shown in FIG. 7 differs from the system shown in FIGS. 5 and 6 in that should a station having a higher priority exhibit a demand for fibers when another station is being served, the system will skip back to the higher station and satisfy its demands. For example, if the station 508 were being served but was not satisfied and the switch 520 returned to connection with the line 526 indicating a demand, the relay 572 after a very short time period during which the capacitor 580 discharged, would be deactivated, cutting off the current path through valve $V_3$ which then closes. At the same time, relay 554 would be reactivated closing switches 566 and 562 so that the valve $V_1$ is again opened to remove fibers. After the station 504 has again been satisfied switch 520 will shift again into connection with line 532 and once again the system serves the next station demanding fibers in priority.

Once the complete cycle has been finished with all of the rake or control level switches 520, 522 and 524 shifted to their satisfied condition in connection with line 532, 534 and 536, respectively, a current path is created through the relay 540 which charges a capacitor 542 and opens normally closed switch 546 which in turn cuts off the energy supplied to the motor 552. The purging operation now takes place and the charged capacitor 542 will cause the relay 540 to remain activated for a short time sufficient for purging even should one of the rake or control switches 520, 522 or 524 shift during purging indicating a demand. The activation of relay 540 also closes the normally open switch 580, completing a current path through the coil 554, 556 or 572 of the last station actually served. The values of the capacitors 558, 562 and 580 associated with the relays 554, 566 and 572 are carefully chosen so that the discharge rate will be such to keep the coil with which it is associated activated for a shorter time after the current path is removed. The discharge time, however, is short enough so that by the time purging takes place all of the relays will be deactivated except the one which was served last. Of course, if the last station was served very quickly it is possible that more than one relay will be still activated during purging. However, a relay associated with a station which did not receive fibers during the cycle obviously could not still be activated. Thus, if station 508 was served last, which it normally would be, then the coil 572 will still be sufficiently charged to maintain relay 572 activated when switch 580 is closed completing a new path through relay 572 via switch 576 and diode 590. Valve $V_3$ thus remains open during purging, and this valve will be the only one open during purging. Since the last station to be served during any cycle is the one through which purging takes place, the problem of over feeding is resolved.

Reference is now made to FIG. 8 which illustrates an embodiment of the invention in schematic whereby the distribution system has the ability to feed all of the stations from one of two sources or a predetermined number of stations from one supply and the rest from the other. Other embodiments employing more than one source are disclosed further in application Ser. No. 694,268 filed Dec. 28, 1967. FIG. 8 however, clearly illustrates the scope of the invention of this application which covers multiple as well as single feed systems. The system illustrated in FIG. 8 is especially versatile and flexible in that the source which feeds a given station can be changed by throwing a ganged switch, inserting a single plug or manual cutoff valve into the conduit 676 through which the fiber passes and removing another plug. In this embodiment, two sources of fiber, source A and source B, are adapted to feed fibers, which are suspended in a moving air stream, in the same manner as described in connection with FIGS. 1–3 of the above mentioned application Ser. No. 694,268 to stations 650, 652 and 654. As will become apparent from the following detailed description of the operation of FIG. 8, this embodiment is not limited to any particular number of stations, and it will become obvious how more stations can be added or deleted.

In this embodiment, as in the embodiments shown in FIGS. 2 and 3 of the above mentioned application Ser. No. 694,268, a Master Control comprised of a number of relays which cause the source to feed fibers into the conduit 676 and which cause purging after all stations demanding fibers have been supplied is associated with each source. Master control 656 is associated with source B, and master control 658 with a source A. The distribution system for both sources is energized by applying an electrical potential, for example 110 volts A.C., between 660 and 662. For purposes of illustration, line 660 is shown connected to the positive pole of an alternating current source, and line 662 to the negative pole.

As in FIGS. 1, 2 and 3 of the above mentioned application Ser. No. 694,268, transition valves 666, 668 and 670 are associated with stations 650, 652, and 654 so that when any of these valves are opened, fiber is extracted from the conduit 676 and air which was carrying the fiber passes on into the conduit 678, drawn by the fan 680. Fan 680 may be energized by applying an electrical potential between the lines 682 and 684, or the fan may be energized only when fiber is being distributed or the system purged. Alternatively, each station may have an individual fan associated with it. The operation and structure of transition valves such as valves 666, 668 and 670 are described more fully in connection with FIG. 5 of the above mentioned application Ser. No. 694,268.

The distribution system of this embodiment is capable of supplying the fiber requirements of any of the stations 650, 652 and 654, whenever any of the level control switches, 682, 684 or 686, respectively associated with each of these stations, is opened, indicating thereby the need for additional fiber at that station. The position of each of the ganged switches 690, 692, and 694, each of which is comprised of five individual switches, determines from which source the station associated with that switch is to be fed. For example, when any of the ganged switches is positioned in the "up" position that ganged switch 690 is shown in, then that station will be fed solely from source B. When any of the ganged switches is positioned in the "down" position that ganged switch 694 is shown in, then that station will be supplied solely from source A. This choice between "up" or "down" positions is of course arbitrary, and is made solely for the purpose of detailing the operation of this embodiment. This embodiment could also be used with more than two sources by adding additional positions which the ganged switches can assume and additional circuitry in the same manner as the circuitry already present. Therefore, whenever the ganged switches are in the positions shown in FIG. 8, stations 650 and 652 will be supplied from the source B and station 654 will be supplied from source A. It is apparent that all three of the stations could be supplied from either source or two could be supplied from one and one from the other. Any of the stations can of course be removed from the system so that no fiber is supplied to it by throwing the appropriate on-off switches as described below.

In this embodiment, stations which are shown closest to each supply need not be supplied from that source. Furthermore, if two or more stations are demanding fiber from either supply, stations to the "left" receive fiber first. Neither of the conditions necessarily is indicative of the actual physical arrangement since the stations can be physically disposed in any location, regardless of their position in the schematic of FIG. 8, so that station 650, for example, could be just as easily located next to source A as source B. It should then be obvious that the arrangement of stations on FIG. 8 is not a limitation.

Assuming that the ganged switches 690, 692 and 694 are all in the position shown and that the level control switches 682, 684 and 686 are all open, calling for fiber, the operation of this embodiment will now be detailed. Whenever all of the level control switches of all of the stations to be fed from source B are closed, indicating no need for fiber at any of the stations, current passes through coil 696 of recycle timer relay 698 and coil 700 of relay 701, preventing the distribution system which distributes fiber from source B from operating, while also interrupting the circuit which supplies the electrical excitation to cause source B to supply fibers. When this embodiment is then operated with the ganged switches 690, 692 and 694 in the positions shown in FIG. 8 with stations 650 and 652 then supplied from source B and station 654 from source A, a current path leads through coils 696 and 700 via lines 660 and 702, normally closed switch 704, line 706, switch 708 of ganged switch 690, lines 710 and 712, closed level control switch 682, lines 714 and 716, switch 718 of ganged switch 690, line 720, switch 722 of ganged switch 692, lines 812 and 814, level control switch 684, lines 838 and 840, switch 726 of ganged switch 692, line 728, switch 730 of ganged switch 694, line 732, switch 734 of ganged switch 694, line 736, coils 696 and 700, and line 662.

The passage of current though coil 700 opens normally closed switch 737 immediately, cutting off the current which was flowing through coil 738 of feeder relay 739 via lines 660, 740 and 742, closed switch 737, and line 744. The normally closed switch 746 then opens immediately preventing source B from supplying fibers to conduit 676 in the same manner as in FIGS. 1-3 of the above mentioned application Ser. No. 694,269. However, the switch 746 delays for a short time in closing a after current begins to flow through coil 738 so that the system will be fully prepared to receive fiber fed into the conduit 676 from source B.

The normally closed switch 704 delays for a period of a few seconds in opening so that purging can be accomplished as described below. Switch 704 then opens a predetermined time after current begins to flow through coil 690 and interrupts the flow of current through coils 696 and 700. The interruption of current through coil 700 closes switch 737 and the interruption of current through coil 690 closes switch 704 recompleting the current path through coils 690 and 700. Therefore current will flow through coils 690 and 700 except during momentary periodic intervals during which switch 704 briefly opens and switch 737 briefly closes. Switch 737 never closes however for a time sufficient to allow coil 738 to close the switch 746 which delays for a few seconds in closing.

However, when the passage of current through coils 690 and 700 is interrupted by the opening of either or both of the level control switches 682 and 684, switch 737 remains closed and current flows through coil 738 of feeder relay 739 until switch 746 closes causing source B to begin to supply fibers.

Between the time when a level control switch opens and when switch 746 closes, the transition valve of the station demanding fiber which is to be supplied first is opened so that fiber can be supplied to that station. For the purposes of explaining the operation of this embodiment, the switch 682 will be assumed to open first followed immediately by the opening of switch 684. It will of course be understood that should one level control switch 682 or 684 open, and not the other, the station associated with the open level control switch alone will be fed.

Since stations 650 and 652 are both supplied from source B, station 650 receives the fiber from source B first since it is furthest to the "left" in the drawing. As pointed out above, this does not necessarily mean that station 650 is physically nearest to source B or to the "left." Because the switch 682 is open, current flows through the relay coil 750, opening the valve 666. The positive pole of the potential connected to line 660 is then electrically linked to one side of the coil 750 via line 702, closed switch 704, line 706, switch 708 of ganged switch 690, lines 710, 712, 752 and 754, switch 756, line 758 and on-off switch 760. The negative pole attached to line 662 is attached to the other side of coil 750 via lines 762 and 744 so that the potential between line 660 and 662 appears across coil 750, opening valve 666.

The transition valve 666 remains open, supplying fibers to the station 650 until the level control switch 682 closes, indicating that the station has received a sufficient amount of fiber. The closing of switch 682 then completes a current path through the relay coil 790 of the relay 792. This path leads from the positive pole through lines 660, 702, normally closed switch 704, line 706, switch 708 of the ganged switch 690, lines 710 and 712, switch 682, line 800, coil 790, and lines 762, 744 and 662 to the negative pole. The passage of current through coil 790 immediately closes switch 802 and shifts switch 756 from contact with line 754 to contact with line 804. This interrupts the current flowing through coil 750 and the transition valve 650 closes immediately. The closing of switch 802 provides a parallel path around switch 682 so that current will flow through coil 790 until all the stations which are to be fed from source B have received fiber, even if switch 682 opens indicating a need for additional fiber.

The closing of switches 682 and 802, which occurs when the fiber needs of station 652 have been completely satisfied, also completes a current path through the relay coil 806 which in turn opens the transition valve 668 in the same manner as valve 666. This current path through coil 806 begins at line 660 and continues through line 702, closed switch 704, line 706, switch 708 of ganged switch 690, lines 710 and 712, level control switch 682 (or line 752, switch 802 and line 800) lines 714 and 716, switch 718 of ganged switch 690, line 720, switch 722 of ganged switch 692, lines 812, 814, and 816, switch 818, line 820, on-off switch 822, coil 806, and lines 762 and 744 to line 662. In the same manner as described in connection with the operation of station 652, valve 668 remains open as long as the level control switch 684 indicates a need for additional fibers by remaining open. The closing of switch 684 connects the coil 824 of relay 826 between lines 814 an 762 which are respectively at the potential of the lines 662 and 660. The passage of current through coil 824, which results from the closing of level control switch 684, closes switch 830 and shifts switch 818 from line 816 to line 834, interrupting thereby the passage of current through coil 806 and closing valve 668.

Since station 652 is the last station which is to be fed from source B, the system is now purged in a manner similar to that discussed in connection with FIGS. 1–7. The closing of switch 684 completes a current path though the coil 700, opening the switch 737. The opening of switch 737 interrupts the current path though coil 738 of the feeder relay 739, opening the switch 746 immediately. The opening of switch 746 then removes the excitation which causes the source B to supply fibers. This current path through coil 700 leads from line 660, through line 702, normally closed switch 704, line 706, switch 708 of ganged switch 690, lines 710, 712, and 752, closed switch 802, lines 800, 714 and 716, switch 718 of ganged switch 690, line 720, switch 722 of ganged switch 692, lines 812, 814 and 816, switch 830, lines 836, 838 and 840, switch 726 of ganged switch 692, lines 728, switch 730 of ganged switch 694, lines 732, switch 734 of ganged switch 694, line 736, coil 700 and line 662. Since coil 690 is connected in parallel with coil 700 a path also passes through coil 690. After current passes through the coil 690 for a predetermined length of time the switch 704 opens interrupting the paths through the coils 690 and 700.

The closing of the level control switch of the last station which is to be fed from source B, in this example switch 684, also completes a circuit through the relay coils associated with each of the transition valves of stations fed from source B so that purging occurs. The closing of switch 684 then connects coils 750 and 806 between lines 762 and 736, which are respectively at the potentials of lines 660 and 662. Current passes from line 762 through coil 750, on-off switch 760, switch 756, line 804, and switch 856 to line 736, and from line 762 through coil 806, on-off switch 822, line 820, switch 818, line 834, and switch 868 to line 736.

Between the time when switch 746 opens and when switch 704 opens, the system is purged. All of the transition valves associated with source B, in this example transition valves 666 and 668, are open but no additional fiber is supplied from source B. The opening of switch 704 interrupts the current path through coils 790 and 824, opening switches 802 and 830 and shifting switch 756 from line 804 to 754 and switch 818 from line 834 to 816. The movement of switches 756 and 818 interrupts the current paths through coils 750 and 806, closing valves 666 and 668.

In addition, the opening of switch 704, also interrupts the current paths through coils 690 and 700 closing switch 737 and switch 704. The closing of switch 704 recompletes the current path through coils 690 and 700, opening switch 737 immediately and switch 704 after a predetermined time, as well as completing the path through coils 790, 824, 750 and 806. Therefore, the system will purge itself in the manner described each time switch 704 opens until a level control switch, in this example switch 682 or 684, opens, indicating a need for additional fiber at which time the system will supply fiber to the station in the manner described. Often, the number of stations fed will be sufficient so that a level control switch will usually be open after a single purging.

At the same time that station 650 is being fed, station 654 is being simultaneously and independently supplied from source A. A plug or manual cut-off valve 835 would of course have to be inserted in the conduit between the stations 652 and 654 to insure that each station would be fed by just one source.

The distribution system associated with source A operates similar to the system associated with source B in that whenever all of the level control switches associated with source A are closed, source A is prevented from supplying fibers and the system is periodically purged. Since in this example only station 654 is supplied from source A, level control switch 686 when closed completes a circuit through coils 860 and 862 via lines 660, 740, 864, and 866, normally closed switch 868, line 870, switch 872 of ganged switch 690, line 874, switch 876 of ganged switch 690, line 878, switch 880 of ganged switch 692, line 882, switch 884 of ganged switch 692, line 886, switch 890 of ganged switch 694, lines 892 and 894, level control switch 686, lines 896, and 898, switch 900 of ganged switch 694, lines 902 and 904, coils 860 and 862, and lines 906, 908, 762, 744 and 662. When switch 686 is closed, current also flows through coil 910 of relay 912 from line 762 which is at the potential of line 660 to line 902 which is at the potential of line 662 via lines 914, 896 and 898, and switch 900 of ganged switch 694. As described in connection with master control 656 switch 868 will periodically open and the system will repeatably purge itself until switch 686 opens, indicating a need for additional fibers.

When level control switch 686 opens, the current path through coils 862 and 860 is interrupted and the normally closed switch 916 closes. The closing of switch 916 connects coil 918 between line 762 which is at the potential of line 662 and line 864 which is at the potential of line 660, via line 920. The passage of current through coil 918 closes switch 922 which applies an excitation to the source A to cause fibers to be fed into the conduit 676. However, switch 922 delays a few seconds in closing so that the station will be fully ready to receive the fibers.

The opening of level control switch 686 also completes a current path through coil 924, opening valve 670 thereby, from line 886, which is at the potential of line 660, switch 890 of ganged switch 694, lines 892, 894 and 926, switch 928, on-off switch 932, line 934, and coil 924 to line 762 which is at the potential of line 662. When switch 686 closes indicating that enough fibers have been fed to station 654, a circuit is completed through coil 910 from line 894 to line 762 and switch 928 shifts from line 926 to line 930.

Since station 654 is the only station fed from source A, the system is purged after the fiber needs of station 654 have been satisfied. The closing of switch 686 completes a circuit through coils 860 and 862, opening switch 916 and halting the feeding of fiber into the conduit from source A. The coil 924 is also connected between line 762 which is at the potential of line 662 and line 902 which is at the potential of line 660, via the on-off switch 932, line 934, switch 928, line 930, switch 936 of ganged switch 694 and line 938.

This embodiment also has the further advantage that any of the stations can be wholly removed from the system. For example, station 650 can be removed by closing switch 940, shorting switch 682, and opening switch 750, preventing the opening of valve 666. This feature could also be utilized with any of the other embodiments of the invention disclosed herein.

Thus, it is apparent that there has been described electrical control systems which provide for the stated objects and advantages of the invention. Other objects and advantages and even further modifications and embodiments of the invention will become apparent to those of ordinary skill in the art upon reading this disclosure. However, it

What is claimed is:

1. In a material distributing system of the type having vacuum means for conveying material to a plurality of stations, means at each of the stations for indicating demand or no demand of said material, and actuatable distributor means including actuatable means at each station for extracting said material from said conveying means when actuated, the improvement comprising:
electrical control means responsive to the station demand indicating means for controlling actuation of the respective distributor actuatable means in accordance therewith,
said control means including switching means having a plurality of active positions respectively coupled to said stations between the said demand indicating and distributor means thereof for sensing the indication of the respective demand means and actuating the respective distributor means in accordance therewith for each different active position of the said switching means, and sequencing means serially controlling said switching means whereby a demand is fulfilled at each of said stations upon a demand signal being generated therefrom.

2. A system as in claim 1 including means for automatically stepping said switching means from each of said active positions to the next for at least one cycle of said positions.

3. A system as in claim 2 including means for recycling said switching means from the last of its positions to the first thereof.

4. A system as in claim 3 wherein said recycling means includes delay means for causing said switching means to be in its said last position for a given time before recycling it to said first position.

5. A system as in claim 1 wherein said control means includes means for causing said material to be conveyed by said conveying means continually.

6. A system as in claim 1 wherein said control means includes means for causing said material to be fed by said conveying means to a said distributor means only when the corresponding demand indicating means so indicates.

7. A system as in claim 1 wherein said control means includes means for actuating all said distributor means for a time after the indications of all the demand means have been sensed as aforesaid, whereby the conveying means may be cleared of any residue material which remains in said conveying means after each cycle of operation.

8. In a material distributing system of the type having means for conveying material to a plurality of stations, means at each of the stations for indicating a demand or no demand of said material, and actuatable distributor means at each station for extracting said material from said conveying means when actuated, the improvement comprising:
electrical control means responsive to the station demand indicating means for controlling actuation of the respective distributor means in accordance therewith,
said control means including a switch means having a plurality of active positions respectively coupled to said stations by the said demand indicating and distributor means thereof for sensing the indication of the responsive demand means and actuating the respective distributor means in accordance therewith for each different active position of said switch means, wherein said switch means is of the self-stepping type and includes
rotary switch means having stepper means and plural position wiper means controlled thereby,
said electrical control means including respective switches coupled to said material demand indicating means and operable between two conditions respectively indicating demand and no demand of said material and being further coupled respectively to a plurality of wiper positions for
(A) energizing said wiper means when the respective switch is in one of said conditions to indicate no material demand and thereby causing the said stepper means to step said wiper means to the next position and for
(B) actuating the respective distributor means when the respective switch is in its other condition indicating material demand and until that switch changes to said one condition to cause the wiper to be stepped as aforesaid.

9. A system as in claim 8 wheerin the said two conditions of said switches are closed and open and said one condition indicating no material demand is said open condition.

10. A system as in claim 8 wherein said two conditions of said switches are open and closed and said other condition indicating material demand is said open condition.

11. A system as in claim 8 including actuatable station disconnect means coupled to said switches for causing, when actuated, said stepper automatically to step said rotary switch means from the wiper position connected with said one position to next wiper position.

12. A system as in claim 8 wherein the number of positions for said wiper means is greater than the number of said stations the first of which has its said demand indicating switch coupled to the first said positions,
said system including delayed recycling means coupled to the last of said positions.

13. A system as in claim 8 wherein:
said rotary switch means includes first and second switch banks respectively having first and second wiper arms operated in unison by said stepper means over respective groups of contacts representing said plural positions.
first means coupling said demand indicating switches to respective contacts of said first bank for providing energization via said first wiper arm to said stepper means to effect stepping of said wiper arms for a respective set of contacts to the next when the demand indicating switch in question indicates no material demand and to prevent such stepping when that switch indicates a demand for material, and
second means coupling said actuatable distributor means and respective second bank contacts, corresponding respectively to the first bank contacts to which said indicating switches are coupled, for providing energization via said second wiper arm to the respective distributor means only while the demand indicating switch in question indicates there is a demand for material at the corresponding station.

14. A system as in claim 13 wherein said first and second coupling means includes for each of said stations a respective DPST relay having a coil connected to the respective demand indicating switch and a first pole switch normally connecting energization to the respective contact of said first bank and a second pole switch normally disconnecting the respective distributor means from the corresponding contact of the second bank.

15. A system as in claim 14 including:
feeder control means for causing feed of said material by said conveying means, and
means normally disconnected from each of said first pole switches, but connected to a respective one thereof when the corresponding demand indicating switch indicates a demand for material, for operating said feeder control means to effect said feed.

16. A system as in claim 15 wherein said feeder operating means includes delay means for delaying the said feed of said material.

17. In a system for distributing material of the type that can be conveyed by a stream of air to a plurality of different stations in accordance with the demand sensed at each station, and wherein:

each of said plurality of stations having a respective distributor and a sensing means for giving a signal indicating demand or no demand of said material, each of said distributors having an air and material intake channel, a discharge channel, an outlet for said material for disposition in the respective station, and actuatable means operable only when actuated for extraction of the air and material in its respective intake channel and separating same into the respective said discharge channel and outlet respectively;

and air circulating system including said intake and discharge channels;

and means for supplying said air circulating system with said material;

the improvement comprising:

electrical control system sequentially coupled to each of said station material demand sensing means for controlling the said actuatable means at each of said stations in accordance with said sensing means signal thereof, and including self-stepping stepper switch means having a plurality of positions respectively coupled to said stations between the demand indicating and distributor means thereof for sensing the indication of the demand means and actuating the respective distributor means in accordance therewith for each different position of the stepper means.

18. A system as in claim 17 wherein said stepper switch means includes plural position rotary switch means having wiper means controlled by a stepper solenoid, said demand indicating means being level control limit switches coupled respectively to a plurality of wiper positions of said switch means for energizing said wiper means when the respective limit switch is closed indicating no material demand and thereby causing the said stepper solenoid to step said wiper means to the next position and for actuating the respective distributor means when the respective limit switch is open and until same closes to cause the wiper means to be stepped as aforesaid.

19. A system for distributing material of the type that can be conveyed by a stream of air to a plurality of different stations in accordance with the demand sensed at each station, comprising:

said plurality of stations each having a respective distributor and a sensing means for giving a signal indicating demand or no demand of said material, each of said distributors having an air and material intake channel, a discharge channel, and outlet for said material for disposition in the respective station, and actuatable means operable only when actuated for extraction of the air and material in its respective intake channel and separating same into the respective said discharge channel and outlet respectively;

an air circulating system including said intake and discharge channels;

means for supplying said air circulating system with said material;

an electrical control system coupled to each of said station material demand sensing means for controlling the said actuatable means at each of said stations in accordance with said sensing means signal thereof, wherein said electrical control system comprises a self-stepping rotary stepping switch having a stepping solenoid, two switch banks each with respective wiper arms, and a self-stepping contact coupled to said stepping solenoid, each of said banks having a plurality of terminal positions to which their respective wiper arms may be moved in unison by said stepping solenoid, said distributor actuatable means being respectively coupled to different terminal positions of a first of said switch banks, said sensing means being limit switches respectively coupled to corresponding terminal positions of the second switch bank for energizing the wiper arm thereof only when indicating by being closed that no material is being demanded by the respective station, each of said switch banks having an "off" terminal position, a timer having a normally closed contact disposed between the "off" terminal of said second bank and a source of energization, the timer being actuated to open its contact upon receipt of energization via the "off" terminal position and wiper arm of said second bank, said self-stepping contact being serially connected to the wiper arm of said second bank for conducting current to said stepper solenoid when the second bank wiper is energized to cause the wiper arms of the switch banks to advance one position, a first time delay relay having a coil coupled to the output side of said self-stepping contact and a normally closed contact coupled between the second bank wiper arm and said source of energization for energizing the respective distributor actuatable means a predetermined time after de-energization of said relay by opening of said self-stepping contact, a second time delay relay having a coil coupled to the "off" terminal position of the first rotary switch bank and a normally closed contact, said means for supplying the air circulating system with material including a feeding mechanism operated by electrical controls, and means coupling the said electrical controls to the contact of said second time delay relay for preventing operation of the material feeding mechanism at least while the second bank wiper is at its "off" terminal position and for a predetermined time after the second relay coil becomes de-energized due to de-energization of the second bank wiper arm by the contact of the said first time delay relay.

20. In a material distribution system comprising a plurality of stations, a demand control means which generates a demand or no demand signal for each of said stations, vacuum distribution means which are operable by said demand signal thereby fulfilling the demand request of at least one of said stations, said demand control means comprising a plurality of two state switching means and a plurality of sequencing means, at least one of said sequencing means being respectively coupled to at least one of said stations whereby a demand or no demand signal is serially generated by said sequencing means to operate said plurality of two state switching means whereby said switching means reverse their state upon receiving a demand or no demand signal.

21. A system as in claim 20 including means to change the number of stations capable of receiving material.

22. A system as in claim 20 wherein said vacuum distribution means include at least one conduit in said vacuum distribution means.

23. A system as in claim 20 including means for purging said vacuum distribution means.

24. A system as in claim 20 including time delay means for delaying the distribution of the material when said demand or no demand signal is generated.

25. A system as in claim 20 wherein said vacuum distribution means is comprised of at least one transition valve.

26. A system as in claim 20 including supply means for continuously presenting said material to said stations upon demand.

27. A system as in claim 20 including recycling timing means whereby the filling operation is automatically resequenced.

28. A system as in claim 20, wherein said demand control means is comprised of at least one level control switch which activates a switching means upon closing.

29. A system as in claim 28, wherein said two-state switching means are relays, which are activated upon a signal being generated from said demand control means.

30. A system as in claim 20 including a recycling timing means whereby the filling sequence of said system is automatically re-sequenced.

31. In a material distributing system of the type having pneumatic means for conveying material to a plurality of stations, means at each of the stations for indicating demand or no demand of said material, actuatable distributor means at each station for extracting said material from said conveying means when actuated, and means for supplying material to said conveying means to feed said stations, the improvement comprising:
 a plurality of electrical combinations respectively for said distributor means,
 each combination including a relay and connected thereto a switch adapted to be operated by a respective demand indicating means to an open position to indicate demand by the respective station and to a closed position to indicate no demand thereby,
 means for connecting said combinations in parallel across an electrical source including means connecting said switches in series in a predetermined order which is the predetermined sequence that said stations may be supplied with material by said distributor means,
 means for actuating the distributor means of the first station in said sequence via the respective first relay if the respective first switch is in said open position to indicate a demand by the first station,
 said first relay being operative to deactuate the first station distributor means upon the first switch being operated to said closed position due to the demand of the first station being fulfilled,
 means connecting each remaining relay to the said electrical combination immediately preceding it in the said sequence to cause each remaining distributor means, for which the associated said switch is in its open position, to be actuated in its turn via its respective relay upon a preceding switch being operated as aforesaid to its said closed position and causing the relay which is in the said electrical combination with said preceding switch to deactuate its respective distributor means.

32. In a material distributing system of the type having pneumatic means for conveying material to a plurality of stations, means at each of the stations for indicating demand or no demand of said material, actuatable distributor means at each station for extracting said material from said conveying means when actuated, and means for supplying material to said conveying means to feed said stations, the improvement comprising:
 a plurality of electrical switch means for respective operation by said demand indicating means to an open position to indicate demand by the respective station and to a closed position to indicate no demand thereby,
 a corresponding plurality of relays,
 means for connecting said relays across an electrical source in parallel respectively via the aforesaid switch means including means connecting said switch means in series in a predetermined order which is the predetermined sequence that said stations may be filled with material by said distributor means,
 means for actuating the distributor means of the first station in said sequence via the respective relay if the respective switch means is in said open position to indicate a demand by the first station, and
 means effectively connecting a later relay in said sequence.

33. In a material distributing system of the type having pneumatic means for conveying material to a plurality of stations, means at each of the stations for indicating demand or no demand of said material, actuatable distributor means at each station for extracting said material from said conveying means when actuated, and means for supplying material to said conveying means to feed said stations, the improvement comprising:
 a plurality of switch means for respective operation by said demand indicating means to provide an electrical indication of demand and no demand by the respective station,
 a corresponding plurality of relays each having a coil and at least one contact,
 means for connecting said relay coils across an electrical source in parallel respectively via the aforesaid switch means including means connecting said switch means in series in a predetermined order which is the predetermined sequence that said stations may be filled with material by said distributor means,
 respective means for each relay for connecting said one contact thereof to the distributor means for the station having the demand indicating means which operates the said switch means for the respective relay,
 means for actuating the distributor means of the first station in said sequence via the said one contact and connecting means of the respective relay if the respective switch means indicates a demand by the first station, and
 means for automatically actuating each remaining distributor means in the said sequence via the said one contact of the respective relay only when each prior switch means in the said sequence indicates no demand by its respective station and then only if the respective switch means indicates a demand by its respective station,
 the change in indication by a switch means from demand to no demand being effective to operate the respective relay and its said contact and thereby deactuate the respective distributor means while actuating the next distributor means in the sequence that has its switch means indicating a demand.

34. A system as in claim 33 and further including means for recycling said system in said predetermined sequence and means for purging said conveying means of material before each such recycling of the system.

35. A control apparatus for a material distribution system having pneumatic means for conveying fiber material, entrained in an air stream and supplied to that air stream from at least one source, to a plurality of stations, means at each station for indicating a demand for said fiber material and means at each station and associated with said indicating means for removing said fiber material from said air stream with said entrained fibers material when a source of electrical potential is applied comprising:
 means for causing said source to supply said fiber material to said air stream whenever one of said indicating means indicates material,
 means for checking each of said indicating means associated with each of said plurality of stations after one of said indicating means indicates a demand for said fiber material, causing the removing means associated with an indicating means being checked to remove said fiber material from said air stream whenever said indicating means being checked indicates a demand and preventing a removing means associated with an indicating means being checked from removing said fiber material from said air stream whenever said indicating means being checked does not indicate a demand,
 each said indicating means including a demand switch having a first position when the station associated with that switch has a demand and a second electrical position when the station associated with that switch does not have a demand, relay means electrically associated with each said demand switch having a first condition when said switch is in said first position and the station associated with that switch is being checked and a second condition when said switch is in said second position and the station associated with that switch is being checked, and a removal switch controlled by said relay means so that said removal switch connects a source of potential to said removing means whenever said relay means is in said first condition.

36. A system for distributing fibers entrained in an air stream from at least a single source to a plurality of stations comprising:
  a pneumatic line connecting said source to each of said stations for carrying said air stream with said fibers entrained therein,
  fiber removing means associated with each said station,
  means for directing said air stream into said removing means so that said removing means removes said fibers from said air stream,
  means associated with each station for collecting the fibers removed by said removing means,
  means associated with each said collector for sensing the amount of fibers in said collecting means, and
  electrical control means associated with each said station not responsive when none of said stations senses that an amount of fiber in said collecting means is less than a given value and sequentially responsive, after one of said sensing means senses that an amount of fiber in said collecting means is less than a given value, to each of said sensing means for causing in a given order each said directing means to sequentially direct said air stream into the removing means associated with the sensing means being responded to, whenever the said sensing means being responded to senses that said amount is less than said given value.

37. A system as in claim 36 wherein said fiber removing means includes a chamber, means disposed within said chamber for separating said fibers from said air stream, an inlet tube pneumatically connecting said pneumatic line to said chamber and means for normally preventing said air stream with said fibers entrained therein from entering said chamber and operable by said control means to allow said air stream to enter said chamber.

38. A system as in claim 36 wherin said removing means includes a chamber, means disposed within said chamber for separating said fibers from said air stream, an inlet tube connecting said chamber and said line and an outlet tube for receiving the air stream from said chamber with said fibers removed and including an outlet line pneumatically connected to said outlet tube and fan means disposed in said outlet line for drawing said air stream with aid fibers entrained therein into said chamber and for drawing said air stream without said fibers into said outlet line via said outlet tube.

39. A control apparatus for a material distribution system having pneumatic means for conveying fiber material, entrained in an air stream and supplied to that air stream from at least one source, to a plurality of stations having a set priority for receiving said fiber material, switch means at each station for indicating a demand for said fiber material having a first position indicating demand and a second position not indicating demand, and means at each station and associated with said indicating means for removing said fiber material from said air stream with said entrained fiber material when a source of electrical energy is applied to said removing means comprising:
  means for causing said material source to supply said fiber material to said air stream whenever one of said indicating means indicates a demand for said fiber material,
  a source of electrical energy,
  relay means associated with each said station having coil means actuated by connection to said energy source when said switch means of that station is in said first position and the switch means of all other stations having a higher priority are a said second position,
  switch means associated with each said coil means and controlled by said coil means for connecting said removing means to said energy source when said coil means is activated,
  capacitive means associated with each said coil means and connected in parallel with said coil means for retaining said coil means activated after said coil means is disconnected from said energy source,
  means for purging said pneumatic means, after all of said stations demanding fiber material have been satisfied, through all the stations having said coil means retained activated after all of said stations demanding fiber material have been satisfied, and
  means for preventing said causing means from causing said fiber material source to apply fiber material to said air stream during purging.

40. An apparatus as in claim 39 wherein said preventing means includes second relay means having coil means activated by connection to said energy source when the switch means of all of said stations are in said second position, second switch means associated with said coil means of said second relay means and controlled by said coil means of said second relay means so as to be shifted to a position which prevents said causing means from causing said fiber material source to apply fiber material to said air stream when said coil means of said relay means is activated and further including:
  second switch means associated with said coil means of said second relay means and controlled by said coil means of said second relay means so as to be shifted from a first to a second position when said coil means of said second relay means is activated,
  second switch means associated with each said coil means of said first relay means and controlled by said coil means of said first relay means for connecting said coil means of said first relay means to said energy source when said second switch means associated with said coil means of said second relay means is in said second position, and
  second capacitive means connected in parallel with said coil means of said second relay means for retaining said coil means of said second relay means activated after said coil means of said second relay means is disconnected from said energy source.

41. A control apparatus for a material distribution system having pneumatic means for conveying fiber material, entrained in an air stream and supplied to that air stream from at least one source, to a plurality of stations, means at each station for indicating a demand for said fiber material and means at each station and associated with said indicating means for removing said fiber material from said air stream with said entrained fibers material comprising:
  means for causing said source to supply said fiber material to said air stream whenever one of said indicating means indicates a demand for said fiber material, and
  means for checking in a given order each of said indicating means associated with each of said plurality of stations after one of said indicating means indicates a demand for said fiber material and not checking when none of said indicating means indicates a demand, causing the removing means associated with an indicating means being checked to remove said fiber material from said air stream whenever said indicating means being checked indicates a demand and preventing a removing means associated with an indicating means being checked from removing said fiber material from said air stream whenever said indicating means being checked does not indicate a demand.

42. Apparatus as in claim 41 wherein said checking means checks each of said plurality of stations in a fixed sequence.

43. Apparatus as in claim 42 wherein at any given time, not more than one station is being supplied from each said source.

44. Apparatus as in claim 42 including means for purging said distribution system after each of said plurality of stations in said fixed sequence has been checked.

45. Apparatus as in claim 41, including means for delaying the time at which said source begins supplying fibers to said air stream for a given time after said checking means begins checking the first of said indicating means in said given sequence.

References Cited
UNITED STATES PATENTS

| | | | |
|---|---|---|---|
| 1,971,421 | 8/1934 | Mackenzie | 302—59 |
| 2,140,128 | 12/1938 | Craggs | 302—28 |
| 2,195,407 | 4/1940 | Craggs | 302—28 |
| 2,572,862 | 10/1951 | Israel | 302—28 |
| 3,099,492 | 7/1963 | Mortimer | 302—28 |
| 3,174,805 | 3/1965 | Mortimer | 302—28 |

JOSEPH WEGBREIT, Primary Examiner

H. S. LANE, Assistant Examiner